(12) United States Patent
Yoo et al.

(10) Patent No.: US 11,115,874 B2
(45) Date of Patent: *Sep. 7, 2021

(54) TECHNIQUES FOR RESERVATION PREAMBLE FOR PRIORITIZED MEDIUM CONTENTION IN A NEW RADIO SHARED SPECTRUM COMMUNICATION SYSTEM

(71) Applicant: QUALCOMM Incorporated, San Diego, CA (US)

(72) Inventors: Taesang Yoo, San Diego, CA (US); Xiaoxia Zhang, San Diego, CA (US); Siddhartha Mallik, San Diego, CA (US); Juan Montojo, San Diego, CA (US); Aleksandar Damnjanovic, Del Mar, CA (US)

(73) Assignee: Qualcomm Incorporated, San Diego, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 16/569,193

(22) Filed: Sep. 12, 2019

(65) Prior Publication Data

US 2020/0008108 A1 Jan. 2, 2020

Related U.S. Application Data

(63) Continuation of application No. 15/596,692, filed on May 16, 2017, now Pat. No. 10,455,455.

(Continued)

(51) Int. Cl.
*H04W 28/26* (2009.01)
*H04W 74/08* (2009.01)
(Continued)

(52) U.S. Cl.
CPC .......... *H04W 28/26* (2013.01); *H04W 16/14* (2013.01); *H04W 52/346* (2013.01);
(Continued)

(58) Field of Classification Search
CPC .... H04L 67/303; H04W 16/14; H04W 28/26; H04W 52/346; H04W 72/0446; H04W 72/0453; H04W 72/10; H04W 74/0816
See application file for complete search history.

(56) References Cited

U.S. PATENT DOCUMENTS 9,736,850 B2 * 8/2017 Merlin ............... H04W 72/0493
9,986,586 B2 * 5/2018 Lee ..................... H04W 74/004
(Continued)

OTHER PUBLICATIONS

International Search Report and Written Opinion—PCT/US2017/059078—ISA/EPO—dated Feb. 1, 2018.
(Continued)

*Primary Examiner* — Phuc H Tran
(74) *Attorney, Agent, or Firm* — Arent Fox, LLP

(57) ABSTRACT

Methods and apparatuses for wireless communications are described. The aspects relate to a frame structure for new radio shared spectrum. For instance, the frame structure may provide shared medium access by multiple operators in a new radio shared spectrum system. Specifically, the present aspects provide for utilizing reservation preambles associated with a distinct operator for announcing to other operators a reservation of at least one transmission opportunity of a given frame in the new radio shared spectrum.

18 Claims, 15 Drawing Sheets

Related U.S. Application Data

(60) Provisional application No. 62/417,844, filed on Nov. 4, 2016.

(51) Int. Cl.
*H04W 16/14* (2009.01)
*H04W 52/34* (2009.01)
*H04W 72/04* (2009.01)
*H04W 72/10* (2009.01)
*H04L 29/08* (2006.01)

(52) U.S. Cl.
CPC ... *H04W 72/0446* (2013.01); *H04W 72/0453* (2013.01); *H04W 72/10* (2013.01); *H04W 74/0816* (2013.01); *H04L 67/303* (2013.01)

(56) References Cited

U.S. PATENT DOCUMENTS

| | | | |
|---|---|---|---|
| 10,405,349 B2 * | 9/2019 | Biswas | H04W 16/14 |
| 10,687,355 B2 * | 6/2020 | Yoo | H04W 72/1268 |
| 2011/0075748 A1 | 3/2011 | Novak et al. | |
| 2012/0044829 A1 | 2/2012 | Piggin et al. | |
| 2013/0223348 A1 | 8/2013 | Piggin et al. | |
| 2014/0050126 A1 | 2/2014 | Naden et al. | |
| 2014/0086212 A1 * | 3/2014 | Kafle | H04W 72/1205 370/331 |
| 2015/0078353 A1 | 3/2015 | Zhang et al. | |
| 2016/0227578 A1 * | 8/2016 | Lee | H04W 74/0816 |
| 2018/0132140 A1 | 5/2018 | Yoo et al. | |
| 2018/0206269 A1 * | 7/2018 | Bhorkar | H04L 5/0094 |

OTHER PUBLICATIONS

Lucent A., et al., "LBT and Frame Structure Design for DL-Only LAA", 3GPP Draft; R1-154572—DL LBT—Final, 3rd Generation Partnership Project (3GPP), Mobile Competence Centre; 650, Route Des Lucioles; F-06921 Sophia-Antipolis Cedex; France; vol. RAN WG1, No. Beijing, China; Aug. 24, 2015-Aug. 28, 2015; Aug. 23, 2015 (Aug. 23, 2015), XP051039503, pp. 1-7, Retrieved from the Internet: URL:http://www.3gpp.org/ftp/Meetings_3GPP_SYNC/RAN1/Docs/ [retrieved on Aug. 23, 2015].

* cited by examiner

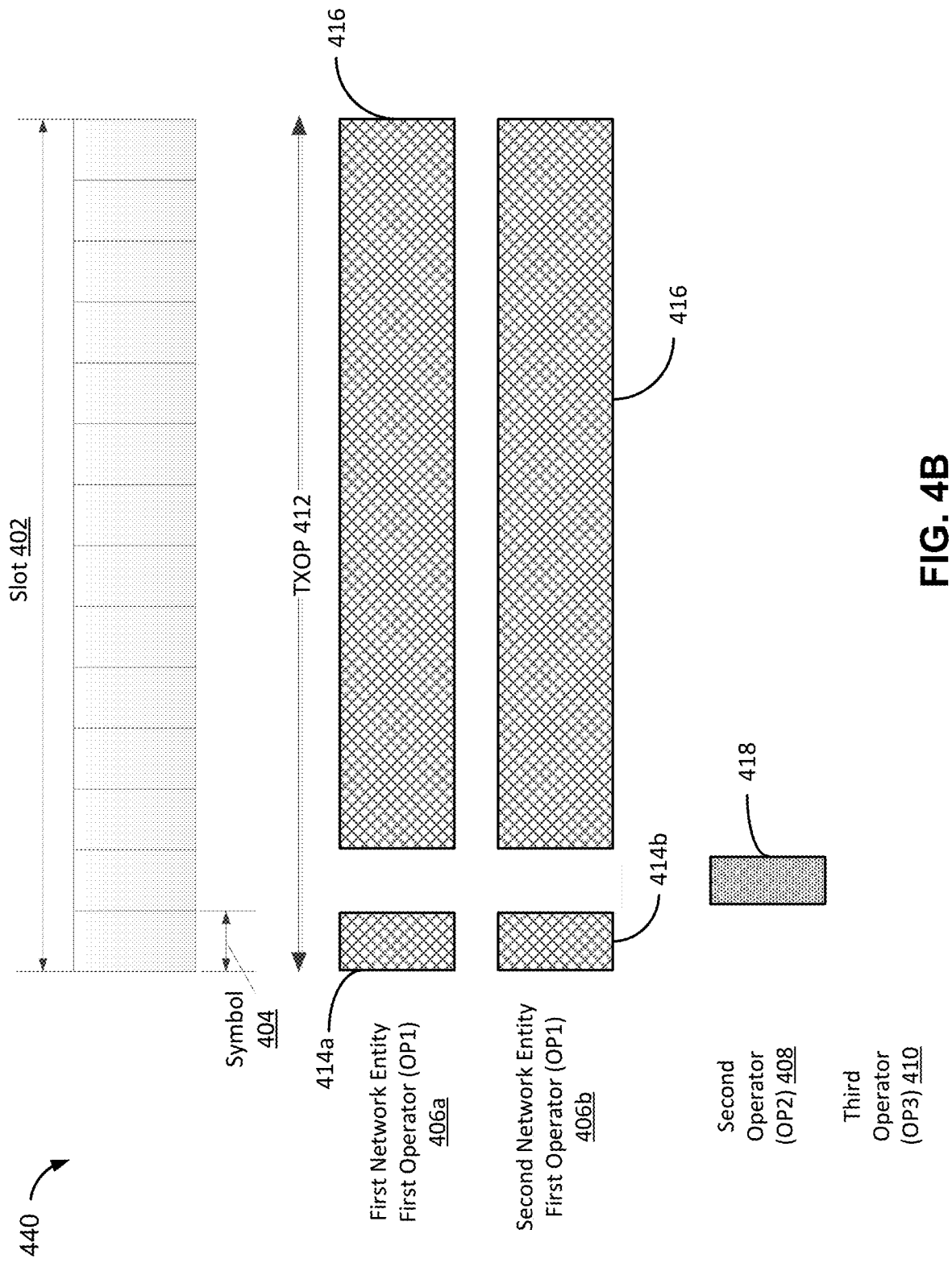

TECHNIQUES FOR RESERVATION PREAMBLE FOR PRIORITIZED MEDIUM CONTENTION IN A NEW RADIO SHARED SPECTRUM COMMUNICATION SYSTEM

CROSS-REFERENCE TO RELATED APPLICATION(S)

This application is a continuation of U.S. patent application Ser. No. 15/596,692, entitled "TECHNIQUES FOR RESERVATION PREAMBLE FOR PRIORITIZED MEDIUM CONTENTION IN A NEW RADIO SHARED SPECTRUM COMMUNICATION SYSTEM" and filed on May 16, 2017, which claims the benefit of U.S. Provisional Application Ser. No. 62/417,844, entitled "TECHNIQUES FOR RESERVATION PREAMBLE FOR PRIORITIZED MEDIUM CONTENTION IN A NEW RADIO SHARED SPECTRUM COMMUNICATION SYSTEM" and filed on Nov. 4, 2016, which is expressly incorporated by reference herein in its entirety.

BACKGROUND

Aspects of this disclosure relate generally to wireless communication networks, and more particularly to techniques for a reservation preamble for prioritized medium contention in a new radio shared spectrum wireless communication network.

Wireless communication networks are widely deployed to provide various telecommunication services such as telephony, video, data, messaging, and broadcasts. Typical wireless communication networks may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems.

These multiple access technologies have been adopted in various telecommunication standards to provide a common protocol that enables different wireless devices to communicate on a municipal, national, regional, and even global level. For example, fifth generation (5G) New Radio (NR) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with strict requirements, especially in terms of latency and reliability; and massive machine type communications for a very large number of connected devices and typically transmitting a relatively low volume of non-delay-sensitive information. As the demand for mobile broadband access continues to increase, however, there exists a need for further improvements in 5G communications technology and beyond. Preferably, these improvements should be applicable to other multi-access technologies and the telecommunication standards that employ these technologies.

As the number of packets being transmitted increases with 5G, techniques are needed to provide efficient and improved process when communicating frames during wireless communications. In certain instances, as the next generation of wireless communications come into existence, more flexible transmissions may be desired in order to ensure adequate or improved levels of wireless communications. Thus, improvements in communication during wireless communication are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure includes a method, an apparatus, and a computer-readable medium for wireless communications. The described aspects may determine, by a network entity of a first operator having a first priority level, whether to transmit on at least a portion of a transmission opportunity. The described aspects may transmit a reservation preamble associated with the first network entity based on a determination by the first network entity to transmit on at least the portion of the transmission opportunity. The described aspects may forgo transmission of the reservation preamble associated with the first network entity based on a determination by the first network entity to not transmit on at least the portion of the transmission opportunity. The described aspects may determine, by a second network entity of a second operator having a second priority level, whether the reservation preamble from one or more network entities of the first operator has been detected. The described aspects may transmit a reservation preamble of the second network entity based on a determination that the reservation preamble from one or more network entities of the first operator has not been detected by at least the second network entity. The described aspects may transmit data associated with the second network entity within the portion of the transmission opportunity subsequent to the transmission of the reservation preamble of the second network entity.

In an aspect, the present disclosure includes a method, an apparatus, and a computer-readable medium for wireless communications at a user equipment (UE). The UE may receive, on a preamble timeslot assigned to the first operator from a network entity, a downlink reservation preamble. The UE may further transmitting, within the preamble timeslot assigned to the first operator and subsequent to the reception of the downlink reservation preamble, an uplink reservation preamble of the first operator to a second network entity.

In accordance with an aspect, the present methods and apparatus relate to wireless communications at a user equipment (UE). The described aspects include receiving, on a downlink channel from a first network entity, a first reservation preamble of a first operator. The described aspects further include transmitting, on an uplink channel, a second reservation preamble of the first operator to a second network entity associated with a second operator.

The present disclosure also includes an apparatus having components or configured to execute or means for executing the above-described methods, and a computer-readable medium storing one or more codes executable by a processor to perform the above-described methods.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout, where dashed lines may indicate optional components or actions, and wherein:

FIG. 4B is a conceptual diagram of an example reservation preamble and data transmission scenario for a highest priority operator having multiple network entities in accordance with one or more example aspects.

DETAILED DESCRIPTION

Figure 1A:
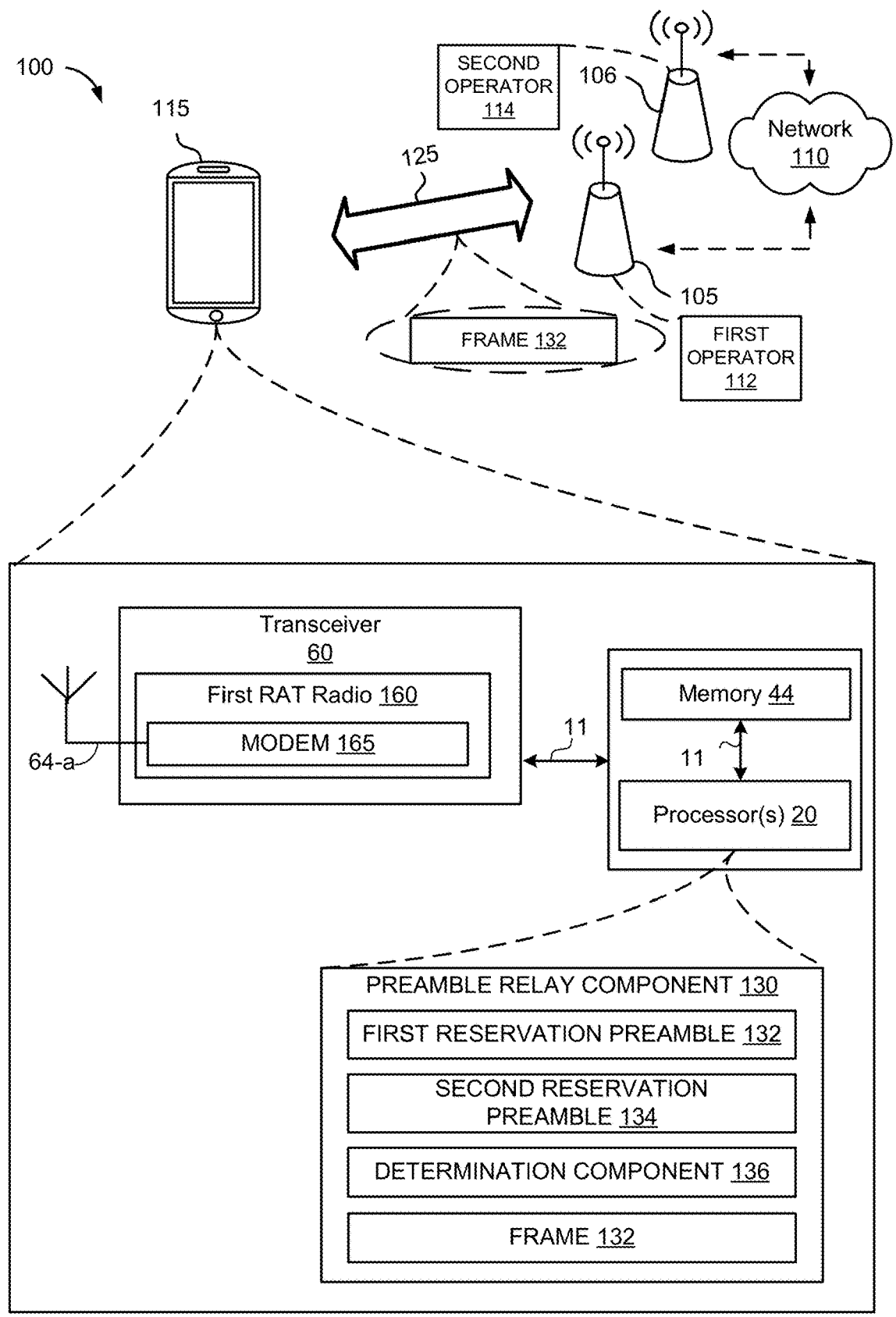
FIG. 1A is a schematic diagram of a wireless communication network including an aspect of a preamble relay component for wireless communications in accordance with one or more example aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts. In an aspect, the term "component" as used herein may be one of the parts that make up a system, may be hardware or software, and may be divided into other components.

The present aspects generally relate to a frame structure for new radio shared spectrum. Specifically, conventional implementations may be unsuited for facilitating communication between user equipments (UEs) and network entities supporting multiple operators. For example, an operator may be or otherwise correspond to a provider of wireless service. In particular, conventional implementations may either inefficiently utilize available spectrum associated with a particular radio access technology (RAT) across multiple operators, or may be unable to utilize available spectrum in conjunction with another operator. As such, a frame structure that allows for or otherwise facilitates multiple operator communication may be desirable. For instance, the frame structure may provide shared medium access by multiple operators in a new radio shared spectrum system.

Even more, medium access in various spectrums such as, but not limited to, an unlicensed spectrum, may utilize a listen-before-talk (LBT) scheme to monitor an unlicensed channel so as to prevent or mitigate interference with another RAT and/or another operator. For instance, LBT may be performed via energy detection or preamble detection, which in some aspects, may utilize random backoff. However, performing LBT in an multi-RAT environment including various operators may encounter a number of drawbacks such as high overhead associated with random backoff, chances of collision if a continuous carrier aggregation (CCA) counter of at least two network entities reaches zero at the same CCA slot, issues associated with hidden network entities and spatial reuse. Accordingly, to overcome the above drawbacks, synchronization may be provided across various network entities (e.g., eNBs). In particular, to achieve such synchronization, the present aspects provide a priority-based medium contention scheme for one or more frequency bands that may or may not have an LBT scheme. For example, a reservation preamble associated with a particular operator may be transmitted by a network entity to notify one or more network entities (e.g., eNBs) of other operators that the network entity will occupy the medium or channel during a given transmission opportunity (e.g., during a time duration of a number of symbols).

Accordingly, in some aspects, the present methods and apparatuses may provide an efficient solution, as compared to conventional solutions, by utilizing reservation preambles associated with a distinct operator for announcing to other operators a reservation of at least one transmission opportunity of a given frame in a new radio shared spectrum. In other words, in the present aspects, a UE may efficiently and effectively receive, on a preamble timeslot assigned to the first operator from a network entity, a downlink reservation preamble, and transmit, within the preamble timeslot assigned to the first operator and subsequent to the reception of the downlink reservation preamble, an uplink reservation preamble of the first operator to a second network entity.

Further, the present aspects provide one or more mechanisms for determining, by a network entity of a first operator having a first priority level, whether to transmit on at least a portion of a transmission opportunity, and transmitting a reservation preamble associated with the first network entity based on a determination by the first network entity to transmit on at least the portion of the transmission opportunity. Additionally, the present aspects provide one or more mechanisms for determining, by a second network entity of a second operator having a second priority level, whether the reservation preamble from one or more network entities of the first operator has been detected, transmitting a reservation preamble of the second network entity based on a determination that the reservation preamble from one or more network entities of the first operator has not been detected by at least the second network entity, and transmitting data associated with the second network entity within the portion of the transmission opportunity subsequent to the transmission of the reservation preamble of the second network entity.

Figure 1B:
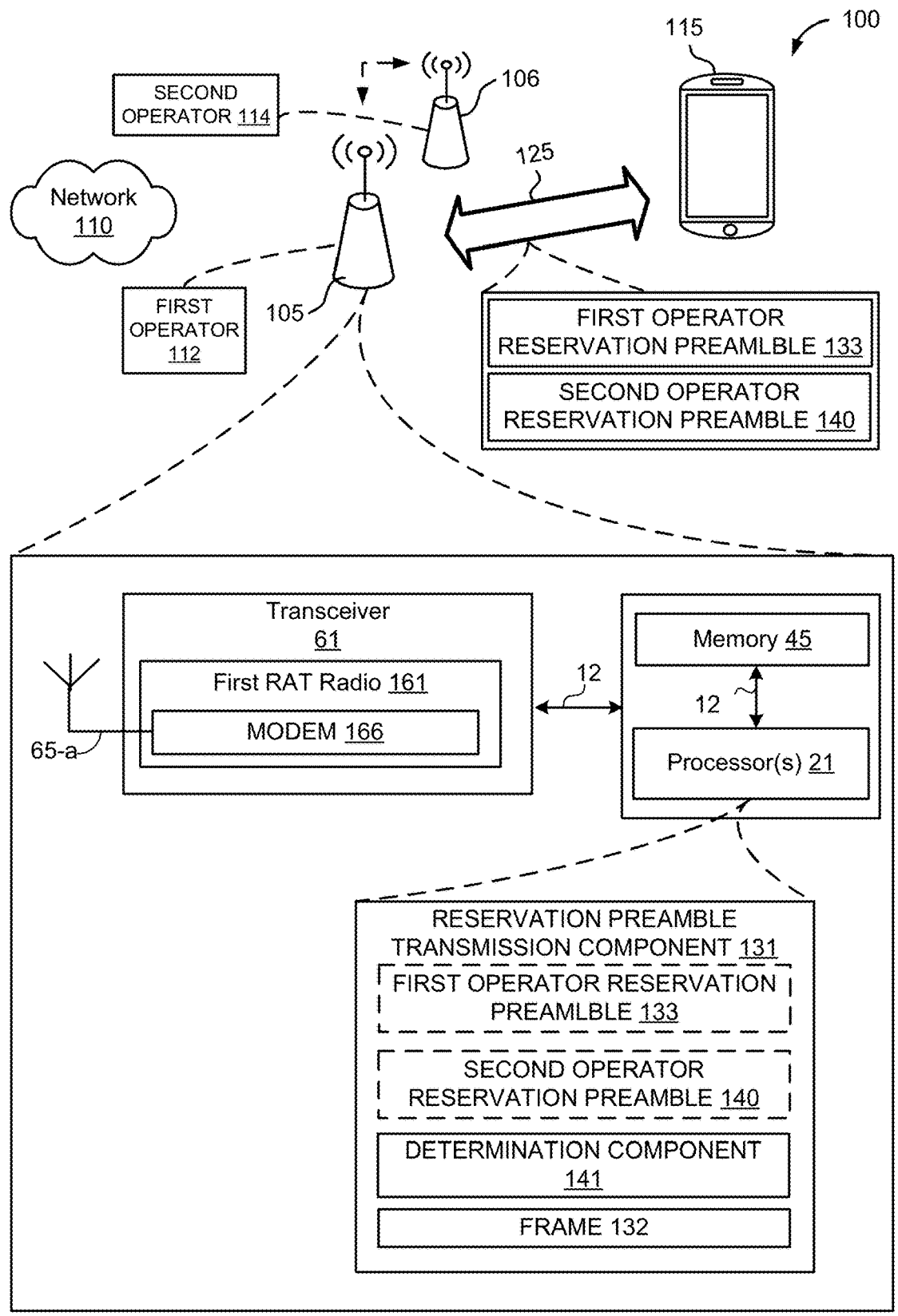
FIG. 1B is a schematic diagram of a wireless communication network including an aspect of a reservation preamble transmission component for wireless communications in accordance with one or more example aspects.

Referring to FIGS. 1A and 1B, in an aspect, a wireless communication system 100 includes at least one user equipment (UE) 115 in communication coverage of at least network entities 105 and 106. The UE 115 may communicate with a network 110 via the network entity 105. In an example, the UE 115 may transmit and/or receive wireless communication to and/or from the network entity 105 via one or more communication channels 125. The one or more communication channels 125 may include an uplink communication channel (or simply uplink channel bandwidth region) for transmission of data from the UE 115 to the network entity 105 and a downlink communication channel (or simply downlink channel bandwidth region) for transmission of data from the network entity 105 to the UE 115, such as but not limited to an uplink data channel and/or downlink data channel. Such wireless communications may include, but are not limited to, data, audio and/or video information. Moreover, in an example, the wireless communications between the UE 115 and the network entity 105 may include 5G new radio (NR) communications.

Referring to FIG. 1A, in accordance with the present disclosure, the UE 115 may include a memory 44, one or more processors 20 and a transceiver 60. The memory 44, one or more processors 20 and the transceiver 60 may communicate internally via a bus 11. In some examples, the memory 44 and the one or more processors 20 may be part of the same hardware component (e.g., may be part of a same board, module, or integrated circuit). Alternatively, the memory 44 and the one or more processors 20 may be separate components that may act in conjunction with one another. In some aspects, the bus 11 may be a communication system that transfers data between multiple components and subcomponents of the UE 115. In some examples, the one or more processors 20 may include any one or combination of modem processor, baseband processor, digital signal processor and/or transmit processor, or any other processor that may, for example, receive, on a downlink channel from a first network entity (e.g., network entity 105), a first reservation preamble 132 of a first operator 112, and transmit, on an uplink channel, the second reservation preamble 134 of the first operator 112 to a second network entity 106. In some aspects, the first reservation preamble 132 may also be referred to as a downlink reservation preamble.

Additionally or alternatively, the one or more processors 20 may include a preamble relay component 130 for carrying out one or more methods or procedures described herein. In an aspect, the term "component" as used herein may be one of the parts that make up a system, may be hardware, firmware, and/or software, and may be divided into other components. The preamble relay component 130, and each of its subcomponents, may comprise hardware, firmware, and/or software and may be configured to execute code or perform instructions stored in a memory (e.g., a computer-readable storage medium).

In some examples, the UE 115 may include the memory 44, such as for storing data used herein and/or local versions of applications or communication with transmission component 130 and/or one or more of its subcomponents being executed by the one or more processors 20. The memory 44 can include any type of computer-readable medium usable by a computer or processor 20, such as random access memory (RAM), read only memory (ROM), tapes, magnetic discs, optical discs, volatile memory, non-volatile memory, and any combination thereof. In an aspect, for example, the memory 44 may be a computer-readable storage medium (e.g., a non-transitory medium) that stores one or more computer-executable codes defining transmission component 130 and/or one or more of its subcomponents, and/or data associated therewith, when the UE 115 is operating one or more processors 20 to execute the transmission component 130 and/or one or more of its subcomponents. In some examples, the UE 115 may further include a transceiver 60 for transmitting and/or receiving one or more data and control signals to/from the network via the network entity 105. The transceiver 60 may comprise hardware, firmware, and/or software and may be configured to execute code or perform instructions stored in a memory (e.g., a computer-readable storage medium). The transceiver 60 may include a first radio access technology (RAT) radio 160 (e.g. UMTS/WCDMA, LTE-A, WLAN, Bluetooth, WSAN-FA) comprising a modem 165 (e.g., a first modem). The first RAT radio 160 may utilize one or more antennas 64 for transmitting signals to and receiving signals from the network entity 105.

Figure 2:
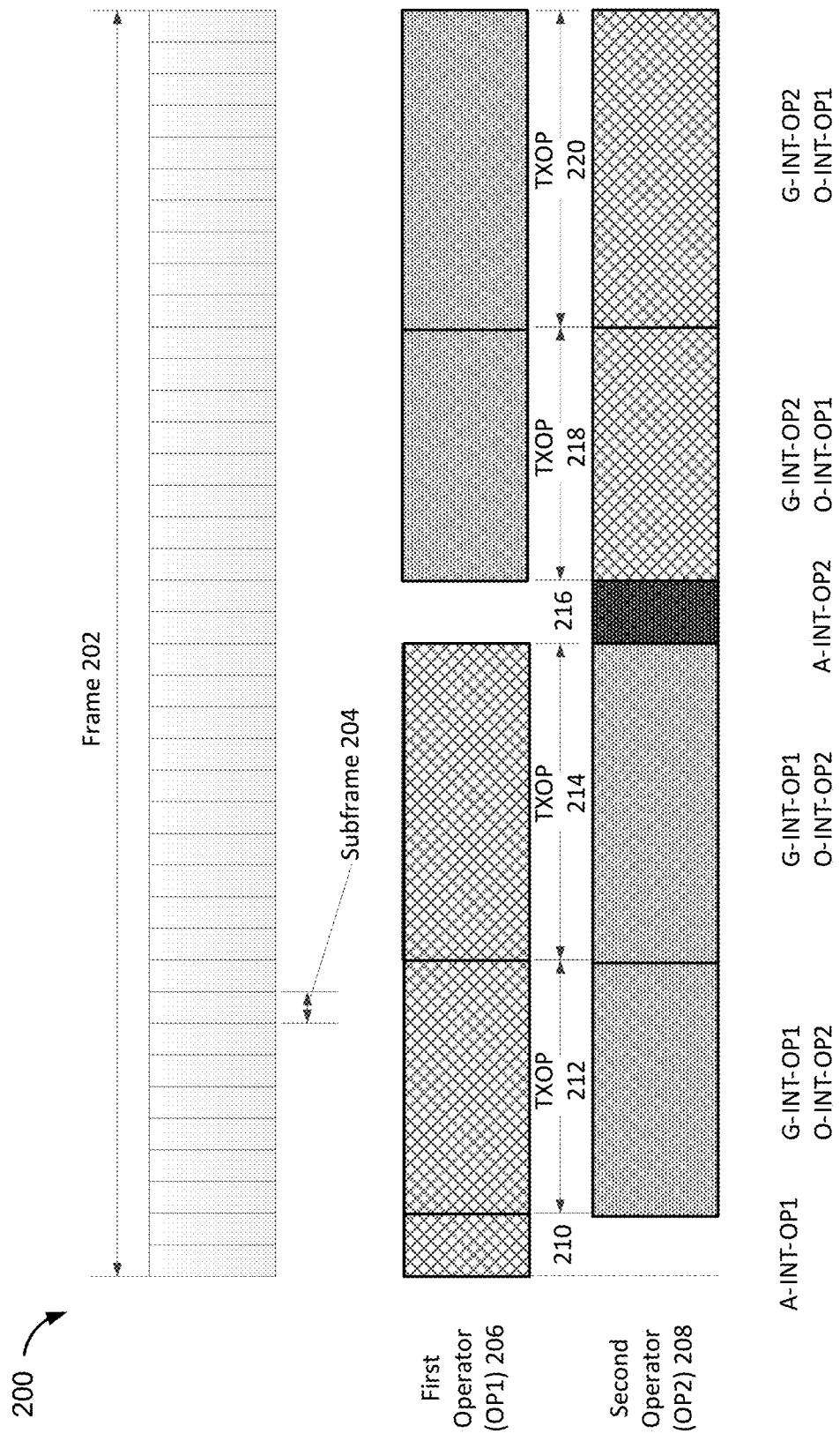
FIG. 2 is a conceptual diagram of an example frame structure in accordance with one or more example aspects.

For example, the UE 115 may include a preamble relay component 130, which may be configured to facilitate transmission or relaying of a reservation preamble according to a new radio shared spectrum frame structure on one or more uplink communication channels to a network entity such as network entity 106. For example, with reference to FIG. 8, a reservation preamble associated with a particular operator (e.g., first operator 112) may inform or otherwise indicate to one or more network entities (e.g., network entity 106) associated with different operators that the network entity 105 will transmit data on a transmission opportunity (e.g., formed of a number of subframes of a consistent time duration). However, in some cases, network entities may be hidden from or remain undetected by the transmitting network entity, e.g., network entity 105, and as such, the reservation preamble may not be received by the potentially interfering network entity (e.g., network entity 106). As such, the UE 115 may transmit the reservation preamble to the one or more network entities that may potentially interfere with the transmission of the transmission opportunity associated with the reservation preamble by the network entity. In some aspects, the UE 115 may transmit one or more transmission opportunities within a frame 132 in accordance with a frame structure that facilities transmission on subframes or symbols associated with multiple or different operators, as illustrated in FIG. 2.

Figure 8:
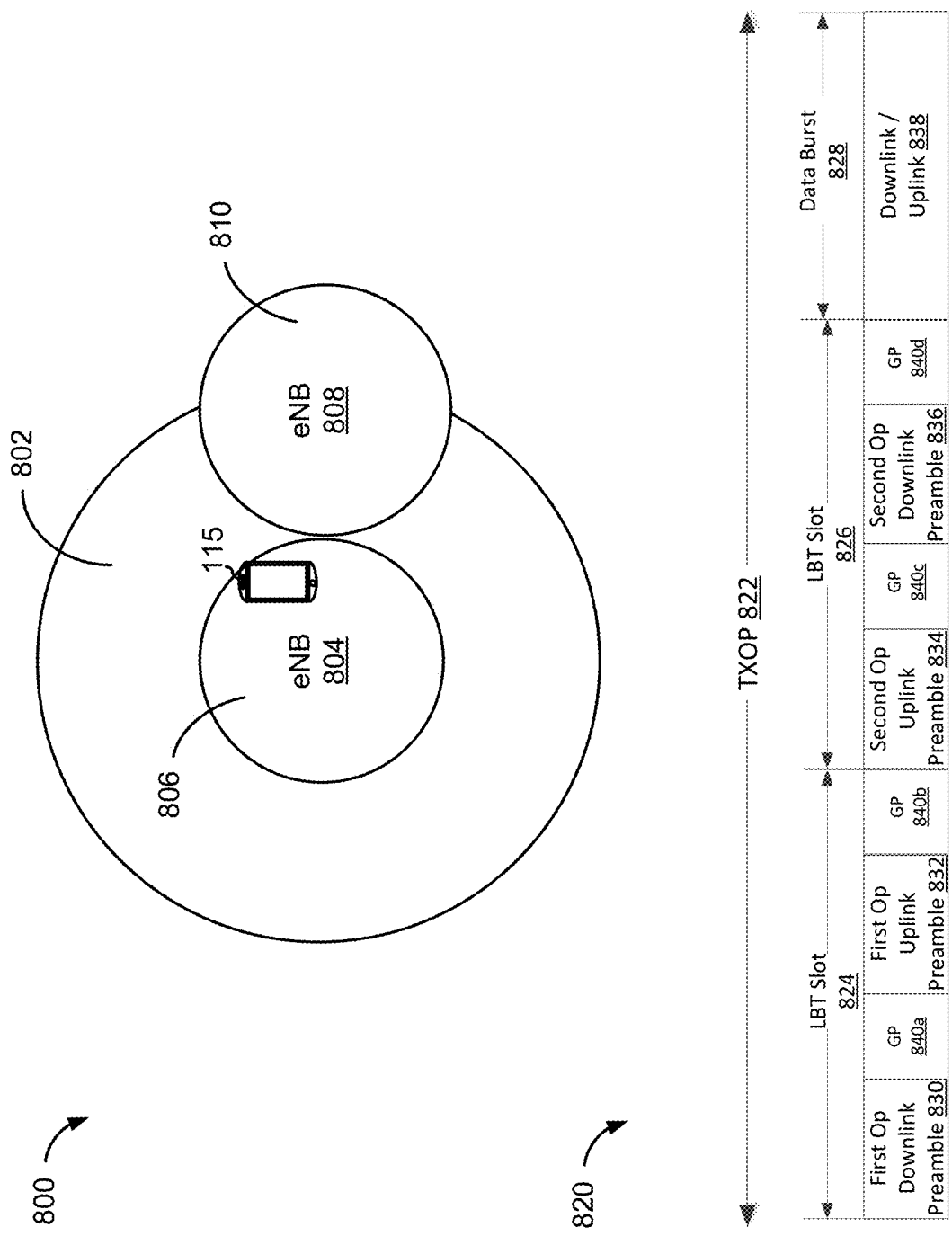
FIG. 8 is a conceptual diagram of a communication system including a UE having preamble relay component and corresponding transmission opportunity structure in accordance with one or more example aspects.
Figure 9:
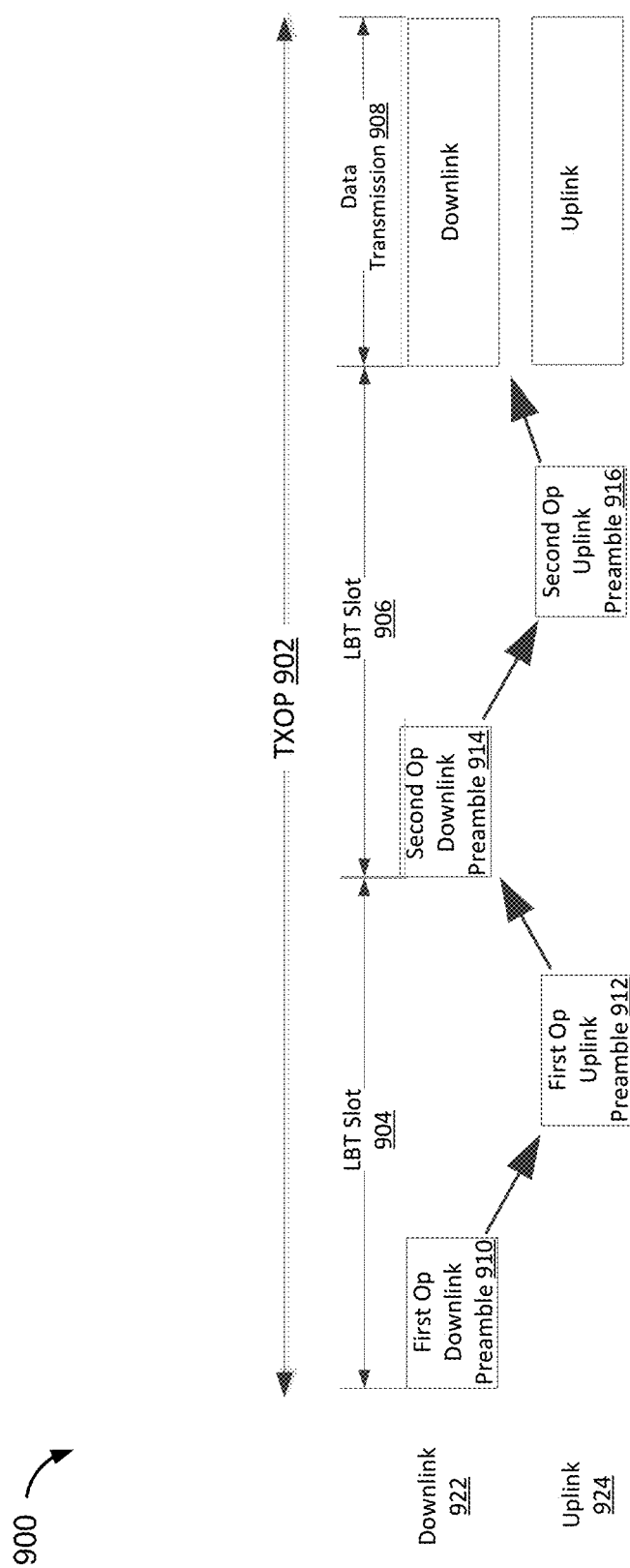
FIG. 9 is a conceptual diagram of a transmission opportunity communication structure in accordance with one or more example aspects.

Specifically, to address hidden node problems, the preamble relay component 130 may be configured to receive a first reservation preamble 132 of a first operator 112 on a downlink channel from the network entity 105 (e.g., which may be a serving eNB). Based on the UE-specific relay scheme, the UE 115 may then transmit a second reservation preamble 134 of the first operator 112 to at least one other network entity (e.g., network entity 106) associated with at least one different operator (e.g., second operator 114) on an uplink channel according to a frame structure 802 as illustrated in FIG. 8 and/or frame structure 900 as illustrated in FIG. 9. In some aspects, the second reservation preamble 134 may also be referred to as an uplink reservation preamble. In some aspects, the second reservation preamble 134 may include a subset of information of the first reservation preamble 132. In some aspects, the first reservation preamble 132 may also be transmitted to network entity 106 associated with a second operator 114. Specifically, the network entity 106 may be able to receive the first preamble directly. The second reservation preamble 134 may be transmitted from the UE 115 to address the potential scenario where the network entity 106 may not be able to hear the first reservation preamble 132 directly.

In one UE-specific relay scheme, for example, all UEs including UE 115 may transmit an uplink reservation preamble (e.g., second reservation preamble 134) upon detection of a downlink reservation preamble (e.g., first reservation preamble 132) from the same operator/cell. For example, the preamble relay component 130 may include a determination component 136, which may be configured to detect the first reservation preamble 132 (e.g., downlink reservation preamble from an associated operator). As such, the UE 115 may transmit the second reservation preamble 134 (e.g., uplink reservation preamble) based on a determination that the downlink preamble from an associated operator has been detected.

In another UE-specific relay scheme, for instance, the downlink reservation preamble (e.g., first reservation preamble 132) may include a payload indicating UE identifiers permitted or configured to transmit the uplink reservation preamble (e.g., second reservation preamble). In such aspect, the first reservation preamble 132 may include at least one UE identifier. Accordingly, the determination component 136 may be configured to determine whether the first reservation preamble 132 (e.g., downlink preamble from an associated operator) is detected, and if so, if the at least one UE identifier contained in the first reservation preamble 132 corresponds to an identifier of the UE 115. As such, the UE 115 may transmit the second reservation preamble 134 based on a determination that the at least one UE identifier corresponds to the identifier of the UE 115.

In yet another UE-specific relay scheme, for example, certain UEs may be semi-statically configured to transmit uplink reservation preambles (e.g., second reservation preamble 134). The UEs may transmit uplink reservation preamble upon detecting a downlink reservation preamble (e.g., first reservation preamble 132) from the operator/cell.

Further, the UE 115, and in particular transmission component 130 may configure the frame structure of frame 132 based on frame configuration information received from the network entity 105. For example, the preamble relay component 130 may be configured to receive an indication including a number of operators from the network entity 105, and determine a transmission opportunity structure including at least one uplink LBT timeslot based on the number of operators from the network entity 105. Accordingly, the preamble relay component 130 may be configured to transmit the second reservation preamble 134 of the first operator 112 to the second network entity during the at least one uplink listen-before-talk timeslot. Further, the UE 115, and in particular the preamble relay component 130 may be configured to receive at least one of a duration or a priority of one or more transmission opportunities, and forgo monitoring of one or more LBT timeslots.

Further, for example, the preamble relay component 130 may be configured to receive, from the network entity 105, an indication including one or both of a duration of at least one of the one or more first transmission opportunities or the one or more second transmission opportunities within the at least one frame 132, or a priority for each of the first operator 112 and the second operator 114. Accordingly, the at least one frame 132 may be transmitted according to one or both of the duration of at least one of the one or more first transmission opportunities or the one or more second transmission opportunities or the priority for each of the first operator 112 and the second operator 114. In some aspects, the multiple operators (e.g., first operator 112, second operator 114, etc.) may be synchronous or synchronized based on, for example, global positioning system (GPS) signaling, network listening, and/or UE-assisted discovery.

The UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. The UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. The UE 115 may be able to communicate with macro eNodeBs, small cell eNodeBs, relays, and the like. The UE 115 may also be able to communicate over different access networks, such as cellular or other WWAN access networks, or WLAN access networks.

Additionally, as used herein, the one or more wireless nodes or wireless serving nodes, including, but not limited to, network entity 105 of wireless communication system 100, may include one or more of any type of network component, such as an access point, including a base station or node B, an eNodeB a relay, a peer-to-peer device, an authentication, authorization and accounting (AAA) server, a mobile switching center (MSC), a radio network controller (RNC), etc. In a further aspect, the one or more wireless serving nodes of wireless communication system 100 may include one or more macro and/or small cell base stations, such as, but not limited to a femtocell, picocell, microcell, or any other base station having a relatively small transmit power or relatively small coverage area as compared to a macro base station.

Referring to FIG. 1B, in accordance with the present disclosure, the network entity 105 may include a memory 45, one or more processors 21 and a transceiver 61. The memory 45, one or more processors 21 and the transceiver 61 may communicate internally via a bus 12. In some examples, the memory 45 and the one or more processors 21 may be part of the same hardware component (e.g., may be part of a same board, module, or integrated circuit). Alternatively, the memory 45 and the one or more processors 21 may be separate components that may act in conjunction with one another. In some aspects, the bus 12 may be a communication system that transfers data between multiple components and subcomponents of the network entity 105. In some examples, the one or more processors 21 may include any one or a combination of modem processor, baseband processor, digital signal processor and/or transmit processor, or any other processor that may, for example, detect at least one reservation preamble from network entities of higher priority operators, and/or transmit a reservation preamble associated with the network entity 105.

Additionally or alternatively, the one or more processors 21 may include a reservation preamble transmission component 131 for carrying out one or more methods or procedures described herein. In an aspect, the term "component" as used herein may be one of the parts that make up a system, may be hardware, firmware, and/or software, and may be divided into other components. The reservation preamble transmission component 131, and each of its subcomponents, may comprise hardware, firmware, and/or software and may be configured to execute code or perform instructions stored in a memory (e.g., a computer-readable storage medium).

In some examples, the network entity 105 may include the memory 45, such as for storing data used herein and/or local versions of applications or communication with the frame determination component 131 and/or one or more of its subcomponents being executed by the one or more processors 21. The memory 45 can include any type of computer-readable medium usable by a computer or processor 21, such as random access memory (RAM), read only memory (ROM), tapes, magnetic discs, optical discs, volatile memory, non-volatile memory, and any combination thereof. In an aspect, for example, the memory 45 may be a computer-readable storage medium (e.g., a non-transitory medium) that stores one or more computer-executable codes defining the frame determination component 131 and/or one or more of its subcomponents, and/or data associated therewith, when the network entity 105 is operating one or more processors 21 to execute the reservation preamble transmission component 131 and/or one or more of its subcomponents. In some examples, the network entity 105 may further include a transceiver 61 for transmitting and/or receiving one or more data and control signals to/from the UE 115. The transceiver 61 may comprise hardware, firmware, and/or software and may be configured to execute code or perform instructions stored in a memory (e.g., a computer-readable storage medium). The transceiver 61 may include a first radio access technology (RAT) radio 161 (e.g. UMTS/WCDMA, LTE-A, WLAN, Bluetooth, WSAN-FA) comprising a modem 166 (e.g., a first modem), and a second RAT radio 171 (e.g., 5G) comprising a modem 176 (e.g., a second modem). The first RAT radio 161 and second RAT radio 171 may utilize one or more antennas 65 for transmitting signals to and receiving signals from the UE 115. In some examples, the transceiver 61 may include one of the first RAT radio 161 or the second RAT radio 171.

For example, the network entity 105 may include the reservation preamble transmission component 131, which may be configured to transmit a reservation preamble in a time slot dedicated to the operator the network entity 105 belongs to, based on an indication that the network entity 105 will transmit data on at least one transmission opportunity of a frame 132. That is, the reservation preamble transmission component 131 may notify or inform other network entities (e.g., second network entity 106) supporting various operators that may potentially interfere with transmission of transmission opportunities by the first network entity 105. In some aspects, the first operator reservation preamble 133 and the second operator reservation preamble 140 may notify one or more network entities including the network entity 106 (e.g., non-serving eNB) that the network entity 105 will transmit data on a channel during the portion of the transmission opportunity for a given operator.

Specifically, the reservation preamble transmission component 131 may be configured to control operator access to one or more transmission opportunities by determining whether higher priority operators have elected not to transmit corresponding reservation preambles. For example, in some aspects, the first operator 112 may have a highest priority level such that access to at least one transmission opportunity may be made without contention with other operators. If a network entity of the first operator 112 elects to transmit data on the at least one transmission opportunity, reservation preamble transmission component 131 may be configured to notify or inform other network entities (e.g., network entity 106) supporting different operators that the network entity 105 of the first operator plans on or will transmit data at the at least one transmission opportunity (e.g., so as to avoid or mitigate interference with the other network entities transmitting on the same frequencies).

In the event the network entity 105 of the first operator 112 foregoes the opportunity to transmit on the at least one transmission opportunity of the frame 132, the reservation preamble transmission component 131 of the second network entity 106 of the second operator 106, and if the second network entity wants to transmit, the reservation preamble transmission component 131 may be configured to transmit a second operator reservation preamble 140 to a distinct network entity of at least the first operator 112, for example, based on a determination that the reservation preamble of the first operator 112 has not been transmitted to at least the second network entity 106.

Further, for a third network entity of a third operator having lower priority than the first and second operators, reservation preamble transmission component 131 of the third network entity may make a similar determination to determine whether the third network entity may transmit an associated reservation preamble for access to the transmission opportunity. That is, when both the first operator 112 and the second operator 114 have determined or elected not to utilize the transmission opportunity, and correspondingly where the third network entity does not detect transmission of neither first operator reservation preamble 133 nor second operator reservation preamble 140, the third network entity may or may not transmit an associated reservation preamble via the reservation preamble transmission component 131.

In some aspects, a number of operators may be transmitted/signaled to the UE 115. The UE 115 may determine the transmission opportunity structure based on the number of operators. For example, the first subframe of a transmission opportunity may be shortened to allow for the LBT slots.

In some aspects, to reduce the LBT overhead, a duration and/or priority of the transmission opportunities may be transmitted/signaled to the UE 115. The UE 115 may utilize such information to reduce power consumption by not monitoring transmission opportunities prohibited to the operator and/or by not monitoring LBT slots not belonging to the serving operator. In some aspects, the UE 115 may be configured using a discontinuous reception (DRX) mask corresponding to a subset of the transmission opportunities.

In some aspects, soft sharing with power control may enable lower priority operators/network entities to transmit at a lower transmit power on transmission opportunities used by a higher priority operator/network entity. For example, the reservation preamble may be detected if a received reservation preamble energy associated with a particular network entity of an operator satisfies (e.g., is above) a certain threshold level (e.g., reception threshold value). As such, if a network entity of a lower priority operator detects a reservation preamble from a higher priority operator, the network entity may be prohibited from using the transmission opportunity. However, such transmission scheme may be loosened for soft sharing. Specifically, instead of prohibiting the transmission by the lower priority network entity, the network entity of the lower priority operator may be allowed to transmit with lower transmit power. Further, the maximum allowed transmit power by the network entity of the lower priority operator may be given as a function of the received reservation preamble power (e.g., may be inversely proportional).

In some aspects, in instances where intra/inter operator backhaul communication is available, backhaul message exchange may be used together with the over-the-air reservation preamble signaling. For example, a network entity of a higher priority operator may send via backhaul to one or more network entities of a lower priority operator an intention to occupy one or more upcoming transmission opportunities. The higher priority operator may still transmit the over-the-air preamble for robustness so that the priority-based sharing can be reliably achieved even when the backhaul signaling is not delivered at all or not delivered on time.

FIG. 2 is a conceptual diagram of an example frame structure 200 in accordance with one or more example aspects. In some aspects, a frame 202 (e.g., having a number of subframes 204) may include a first acquisition interval 210 associated with a first operator 112 and first and second transmission opportunities 212 and 214 having or associated with a guarantee interval for the first operator 112. The frame 202 may further include a second acquisition interval 216 associated with a second operator 114 different from the first operator 112 and third and fourth transmission opportunities 218 and 220 having or associated with a guarantee interval for the second operator 114. In some aspects, the first acquisition interval and the one or more first transmission opportunities may be nonoverlapping with the second acquisition interval and the one or more second transmission opportunities.

In some aspects, the first acquisition interval 210 and the second acquisition interval 216 may allow each operator (e.g., first operator 112 and/or second operator 114, respectively) to send at least one of a downlink discovery reference signal (DRS) or an uplink random access channel (RACH), or in some cases, system critical information or discovery signal. As such, the first acquisition interval 210 and the second acquisition interval 216 may be utilized solely by the associated operator, e.g., the first operator 112 in the case of the first acquisition interval and the second operator 114 in the case of the second acquisition interval. In some aspects, the first acquisition interval and/or the second acquisition interval 136 may include at least one of a downlink clear channel assessment (CCA) exempt transmission (DL-CET) or an uplink CET (UL-CET).

Further, in some aspects, an assignment or allocation of the first and second transmission opportunities 212 and 214 as a guarantee interval ensures the first operator 112 a prioritized transmitting opportunity, while the second operator 114 may have a transmitting opportunity as an opportunistic interval if the first operator 206 elects not to transmit on the resources. That is, the guarantee interval of the first and second transmission opportunities 212 and 214 and/or the third and fourth transmission opportunities 218 and 220 may respectively prioritize medium access without contention to the first operator 112 and the second operator 114, respectively. In other words, an indication that or an assignment of a given transmission opportunity to a particular operator as a guarantee interval guarantees or ensures that the particular operator has prioritized access to the given transmission opportunity prior to or before other operators.

For example, in some aspects, to provide such prioritized access of transmission opportunities, the first operator 112 may be associated with a first priority and the second operator 114 may be associated with a second priority. The relative ordering or comparative values of the priorities may be indicative of an access level of the transmission opportunities. For instance, in some aspects, the first priority may be greater than the second priority within the one or more first transmission opportunities having the guarantee interval for the first operator 112. Further, in some aspects, the second priority may be greater than the first priority within the one or more second transmission opportunities having the guarantee interval for the second operator 114. Although two operators are illustrated and described herein, frame 202 may accommodate two or more operators according to a similar frame structure as described herein with respect to two operators.

Additionally, the transmission opportunities may include opportunistic intervals permitting or otherwise providing medium access to an operator having a priority level lower than the first priority of the first operator 112 or the second priority of the second operator 114 if the highest priority operator does not act on the guarantee interval. For example, the one or more first transmission opportunities further include an opportunistic interval for at least the second operator 114 and the one or more second transmission opportunities further include an opportunistic interval for at least the first operator 112.

Further, in some aspects, the location of the first acquisition interval 134 and the second acquisition interval 138 may be dynamic based on the transmission scheme. For example, in a staggered approach, the first acquisition interval may be adjacent to and followed by the first and second transmission opportunities 212 and 214 and the second acquisition interval 136 may be adjacent to and followed by the third and fourth transmission opportunities 218 and 220. Further, in an aligned approach, the first acquisition interval may be adjacent to the second acquisition interval and followed by the first, second, third, and fourth transmission opportunities 212, 214, 218, and 220.

Figure 3:
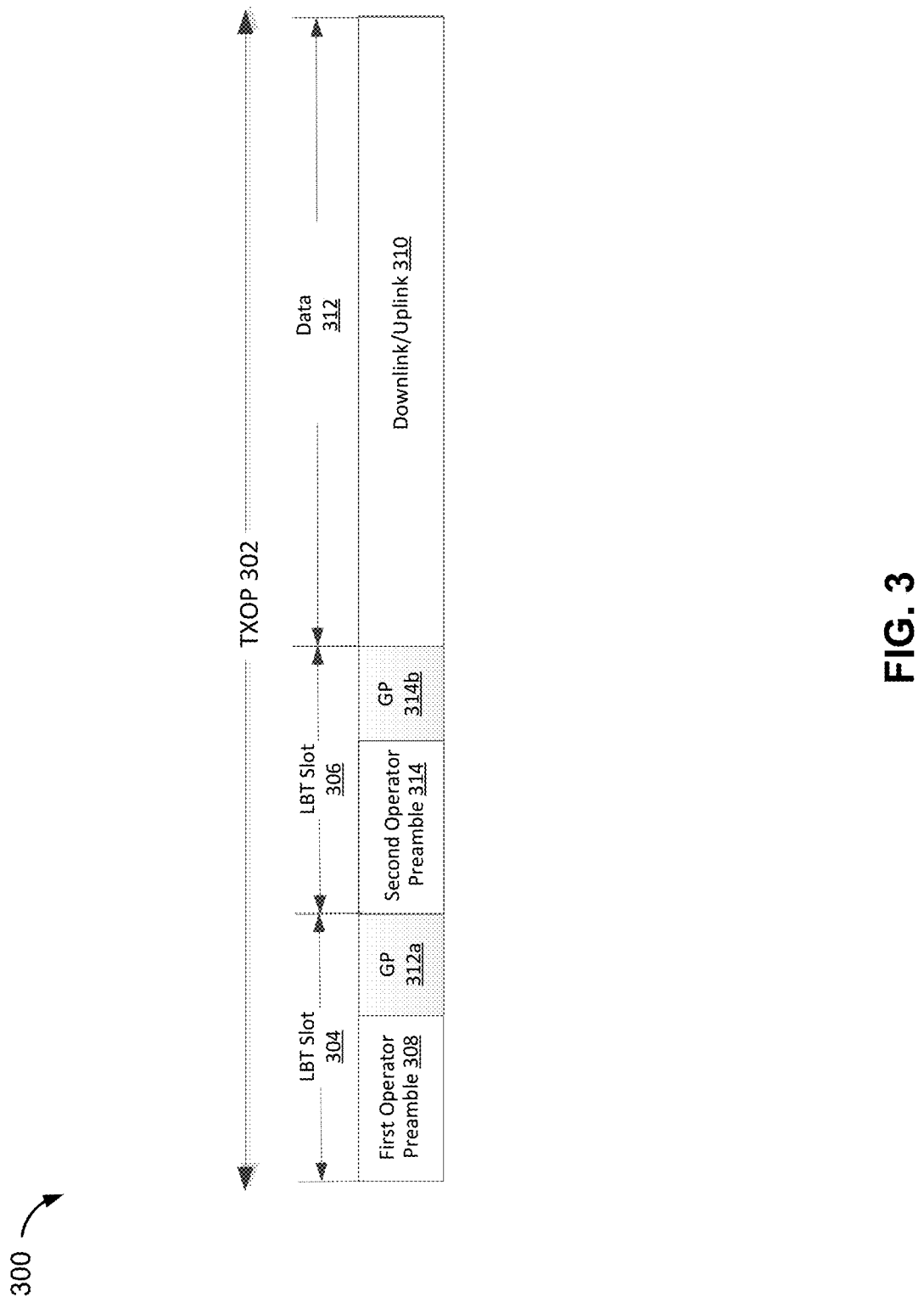
FIG. 3 is a conceptual diagram of an example transmission opportunity including a reservation preamble structure in accordance with one or more example aspects.

FIG. 3 is a conceptual diagram 300 of a transmission opportunity 302 including a reservation preamble structure in accordance with one or more example aspects. For example, the transmission opportunity 302 including a reservation preamble structure may be part of frame 132 in a communication system supporting two or more operators. In some aspects, the transmission opportunity 302 may include one or more LBT slots 304 and 306 allowing for or facilitating transmission of a reservation preamble of a particular operator assigned to an LBT slot based on a priority level. The transmission opportunity 302 may also include a duration for control/data transmission by at least one network entity of the prevailing operator. As such, each transmission opportunity 302 may be used for or by the first operator 112 and the second operator 114. The network entities (e.g., eNBs) of the highest priority operator do not perform LBT while the network entities of the lower priority operators may perform LBT. Further, when occupying the medium, network entities of an operator may send a downlink reservation preamble in the LBT slot to allow network entities of other operators to detect the medium occupancy.

For example, the first operator 112 may have the highest priority and as such, a network entity of the first operator may determine or elect to transmit data on the first operator preamble 308 of the transmission opportunity 302 without contention from network entities of other operators. A network entity of the second operator 114 may transmit data 312 on the downlink/uplink 310 portion of the transmission opportunity 302 if network entities of the first operator 112 elects not to transmit the assigned or allocated first operator reservation preamble 308. Specifically, a network entity of the second operator 114 may detect that any network entities of the first operator 112 did not transmit the first operator reservation preamble 308, and in turn, may transmit the second operator preservation preamble 314. The network entity of the second operator 114 may then access the downlink/uplink 310 medium for transmission of data 312. Likewise, a network entity of a third operator may transmit utilize the transmission opportunity 300 and transmit the assigned or allocated reservation preamble when all of network entities of the first operator 112 and second operator 114 forego transmission of their respective reservation preambles.

In some aspects, when an operator transmits a reservation preamble, a network entity of that operator may transmit the reservation preamble. Likewise, when an operator detects a preamble of another operator, a network entity of an operator may detect a reservation preamble of the network entities of another operator.

Figure 4A:
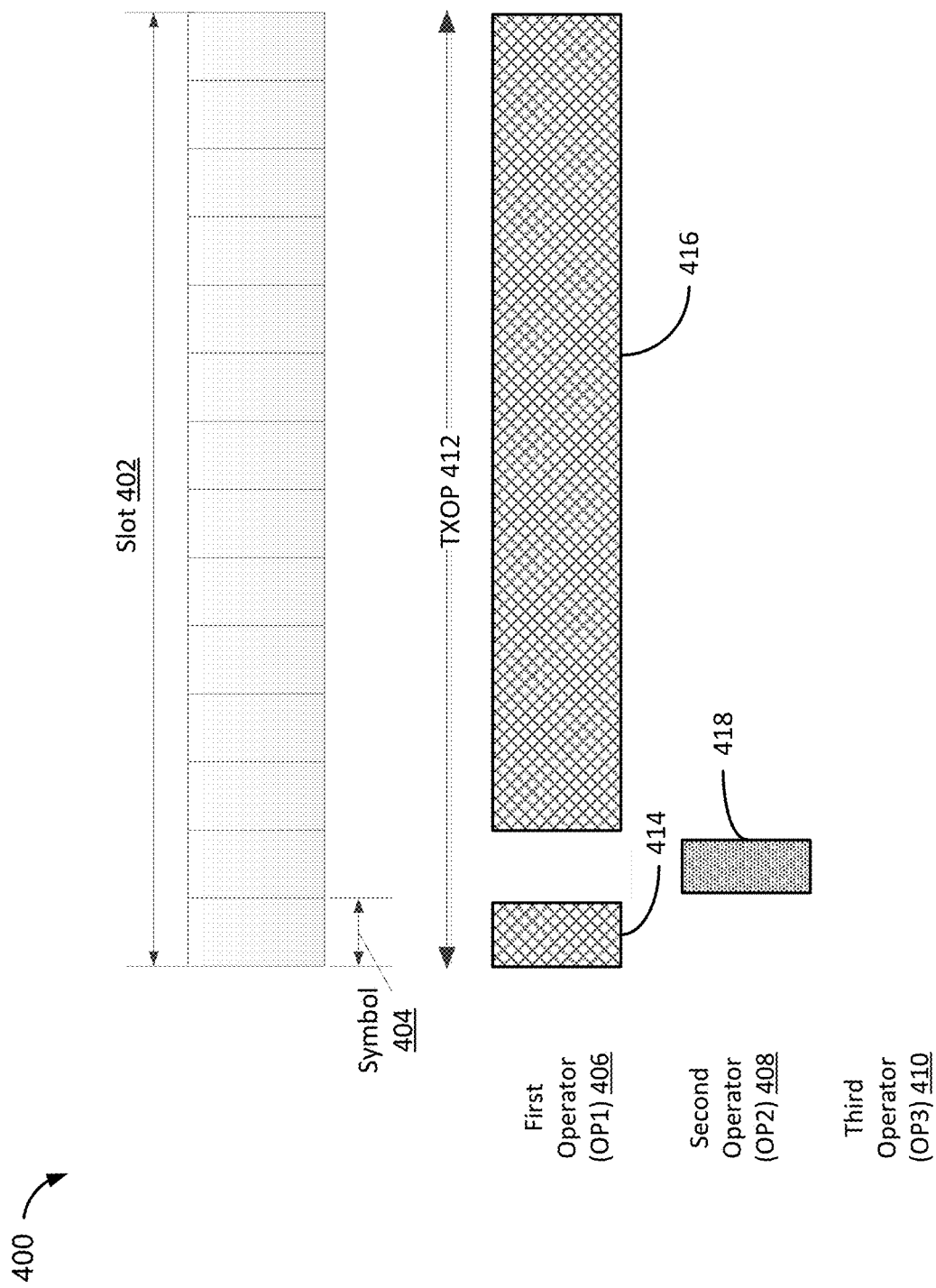
FIG. 4A is a conceptual diagram of an example reservation preamble and data transmission scenario for a highest priority operator in accordance with one or more example aspects.

FIG. 4 is a conceptual diagram of an example reservation preamble and data transmission scenario 400 for a highest priority operator in accordance with one or more example aspects. For instance, the reservation preamble transmission of the first operator 406 may be part of or within slot 402 (e.g., frame 132) in an communication system supporting at least three operators 406, 408, and 410. The first operator 406 may have the highest priority and as such, may determine or elect to transmit on a data portion 416 of the transmission opportunity 412 without contention from the second or third operators 408 and 410, respectively. The second and third operators 408 and 410 may each have a second and third highest priority, respectively. In the example of FIG. 4, as the first operator 406 has elected to transmit on the transmission opportunity and notify nearby network entities by transmitting an allocated reservation preamble 414, the network entities of the second and third operators 408 and 410, which may be in the hearing range of the network entity of the first operator, are precluded from transmitting on the same transmission opportunity. For example, the second operator 408 may detect that the first operator 406 transmitted the first operator reservation preamble 414 and as such, may not transmit the second operator reservation preamble 418 to access the available transmission resources of the transmission opportunity 412. In some aspects, each operator including the first operator 406, second operator 408, and/or third operator 410 may include one or more network entities.

FIG. 4B is a conceptual diagram of an example reservation preamble and data transmission scenario 440 for two network entities 406a and 406b belonging to a highest priority operator 406 in accordance with one or more example aspects. Both network entities of the operator 406 may have the highest priority and as such, may determine or elect to transmit on a data portion 416 of the transmission opportunity 412 without contention from each other. Each of the two network entities 406a and 406b notifies nearby network entities (including to each other) by transmitting an allocated reservation preamble 414a and 414b. However, as the reservation preambles 414a and 414b are transmitted within the same LBT slot, they do not block each other from occupying the transmission opportunity. As a result, both network entities can occupy the transmission opportunity. Thus, some or all base stations or network entities of an operator may access the medium at the same time (e.g., do not block each other) so as to provide synchronized medium sharing.

Figure 5:
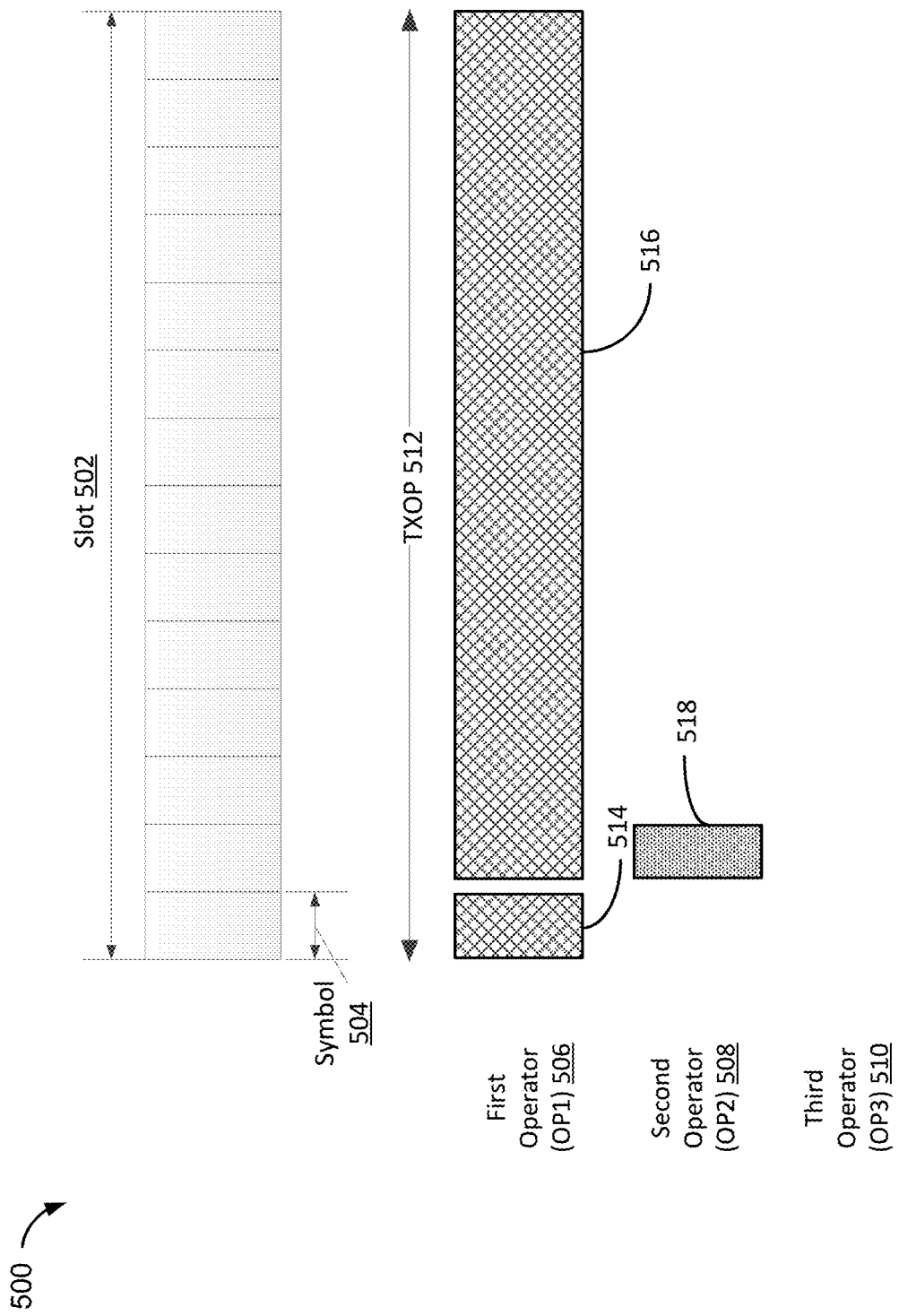
FIG. 5 is a conceptual diagram of an example reservation preamble and data transmission scenario for a highest priority operator in accordance with one or more example aspects.

FIG. 5 is a conceptual diagram of an example reservation preamble and data transmission scenario 500 in accordance with one or more example aspects. For example, the reservation preamble transmission of the first operator 406 may be part of or within slot 502 (e.g., frame 132) in an communication system supporting at least three operators 506, 508, and 510. The first operator 506 may have the highest priority and as such, may determine or elect to transmit on a data portion 516 of the transmission opportunity 512 without contention from the second or third operators 508 and 510, respectively. The second and third operators 508 and 510 may each have a second and third highest priority, respectively. In the example of FIG. 5, as the first operator 506 has elected to transmit on the transmission opportunity and notify one or more network entities by transmitting an allocated reservation preamble 514, the second and third operators 508 and 510 are precluded from transmitting on the same transmission opportunity. In some aspects, the first operator 506 may also utilize a time duration assigned or allocated to second operator reservation preamble 518 as part of the data transmission.

Figure 6:
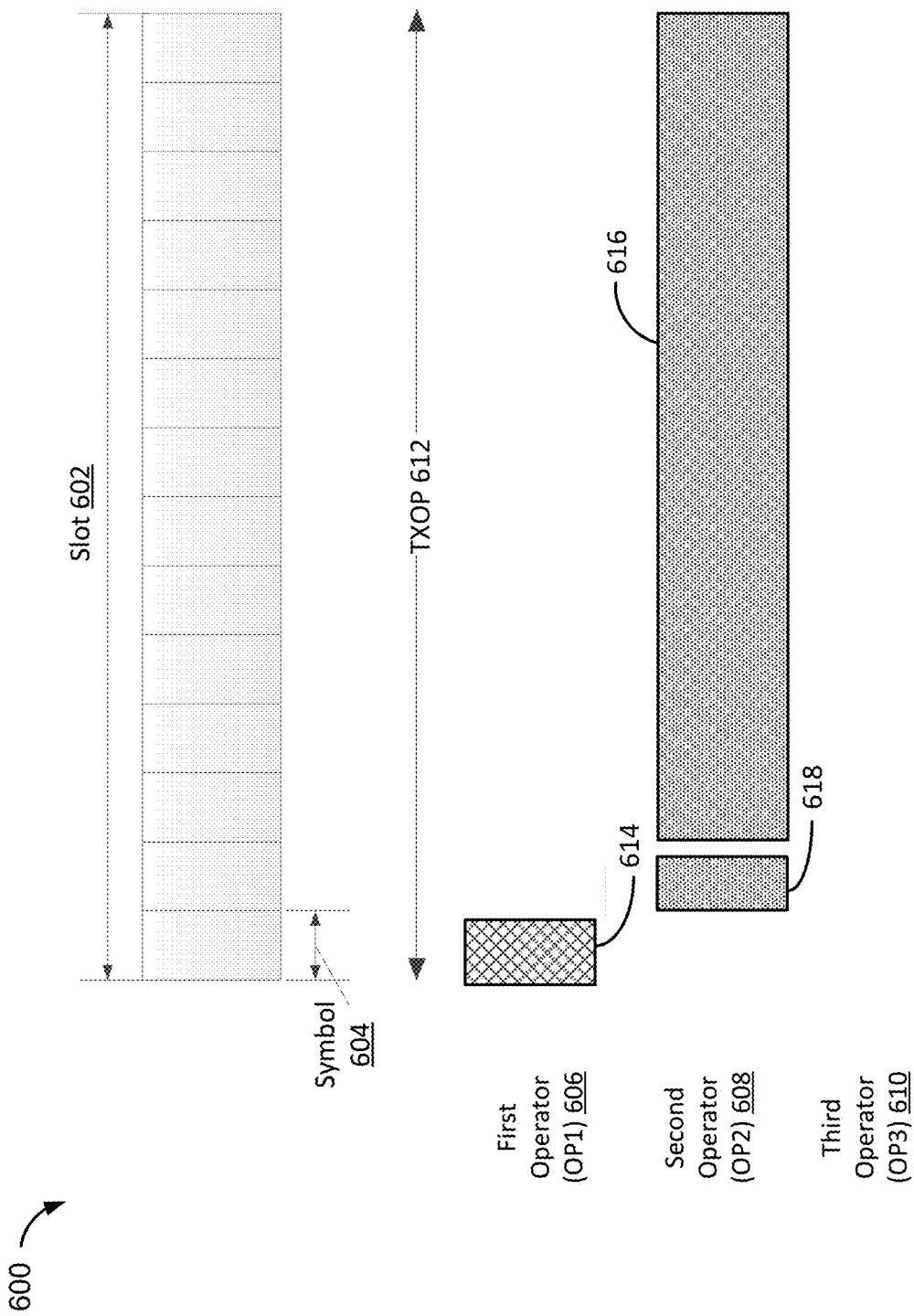
FIG. 6 is a conceptual diagram of an example reservation preamble and data transmission scenario for a lower priority operator in accordance with one or more example aspects.

FIG. 6 is a conceptual diagram of an example reservation preamble and data transmission scenario 600 for a lower priority operator (e.g., second operator 608) in accordance with one or more example aspects. For instance, the reservation preamble transmission of the second operator 608 may be part of or within slot 602 (e.g., frame 132) in an communication system supporting at least three operators 606, 608, and 610. In some aspects, the second operator 608 may determine that the first operator 606 elected not to transmit on the data portion 616 of the transmission opportunity 6012 as it did not transmit the first operator reservation preamble 614. As such, the second operator 608 may utilize the data portion 616 transmission opportunity 612 by initially transmitting an allocated or assigned second operator reservation preamble 608 notifying the other network entities of an upcoming transmission by the second operator 608.

Figure 7:
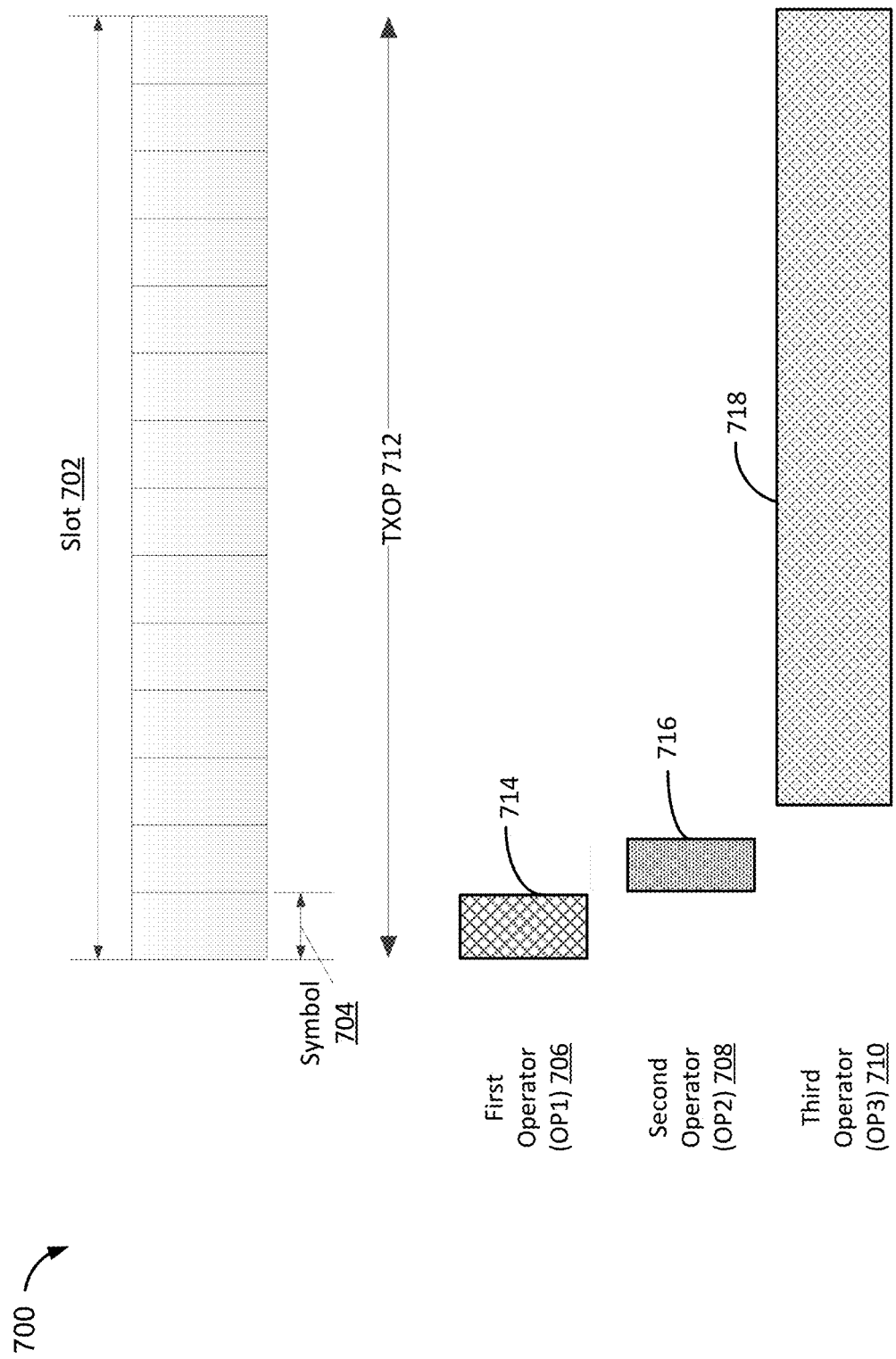
FIG. 7 is a conceptual diagram of an example reservation preamble and data transmission scenario for a lower priority operator in accordance with another example aspect.

FIG. 7 is a conceptual diagram of an example reservation preamble and data transmission scenario 700 for a lower priority operator (e.g., third operator 710) in accordance with one or more example aspects. For example, the reservation preamble transmission of the third operator 710 may be part of or within slot 702 (e.g., frame 132) in an communication system supporting at least three operators 706, 708, and 710. Similar to FIG. 5, the third operator 710 may determine that the first operator 706 and the second operator 716 did not transmit their respective reservation preambles 714 and 716, respectively, and as such, the data portion 718 of the transmission opportunity 712 is available for utilization. That is, the first operator 706 and the second operator 708 have determined not to take or occupy the transmission opportunity 712. Specifically, the third operator 710 detects that neither the first operator reservation preamble 706 nor the second operator reservation preamble 708 has been transmitted. As such, the third operator 710 may occupy or transmit on the available resources of the transmission opportunity 712 without transmitting a reservation preamble.

FIG. 8 is a conceptual diagram of an example communication system 800 including a UE (e.g., UE 115, FIG. 1A) having preamble relay component 130 (FIG. 1A) and corresponding transmission opportunity structure 820 in accordance with one or more example aspects. The communication system 800 illustrates a hidden network entity scenario which may result in an eNB 808 (e.g., belonging to operator B) that potentially interferes with the coverage area of another eNB 804 (e.g., belonging to operator A). For example, the eNB 804 may be a serving eNB of UE 115, and may have a coverage area 806. However, the preamble coverage penetration area 802 may not extend far enough to reach a potential interfere such as eNB 808 belonging to a different operator. Therefore, eNB 808 is a hidden node from eNB 804 for the downlink transmission from 804 to UE 115.

Further, transmission opportunity structure 802 illustrates the downlink and uplink relay structure that permits the UE to receive a reservation preamble from a network entity and transmit the reservation preamble to at least one other network entity for interference mitigation. For example, in a two operator example, a transmission opportunity 822 may include two LBT slots 824 and 826, where LBT slot 824 is associated with a first operator and the LBT slot 826 is associated with the second operator. The LBT slot 824 may include a first operator downlink preamble 830 and a first operator uplink preamble 832. Similarly, LBT slot 826 may include a second operator uplink preamble 834 and a second operator downlink preamble 836. Further, the transmission opportunity 822 may include a data burst portion 828 for downlink/uplink 838 transmission.

To overcome the hidden node or network entity scenario, the UE may also transmit a reservation preamble. In the illustration, if the reservation preamble from the UE 115 reaches the eNB 808, then eNB 808 will detect the preamble and refrain from transmission. Therefore, this addresses the hidden node problem. In some aspects, all UEs may transmit an uplink preamble upon detection of a downlink preamble from the same operator/cell. In some aspects, a downlink reservation preamble may have a payload indicating UE identifier(s). Only those UEs indicated by the UE identifier(s) may transmit an uplink preamble. Further, in some aspects, certain UEs may be semi-statically configured to transmit uplink preambles. Only the indicated UEs transmit uplink preambles upon detecting a downlink preamble from the operator/cell.

FIG. 9 is a conceptual diagram of an example transmission opportunity communication structure 900 in accordance with one or more example aspects. For example, the transmission opportunity communication structure 900 includes transmission opportunity 902 and may be utilized in accordance with FIG. 1A. Transmission opportunity 902 permits the downlink 922 and uplink 924 reservation preamble relaying scheme according to frequency division duplexing (FDD). Specifically, in a two operator example, the transmission opportunity 902 may include two LBT slots 904 and 906, where LBT slot 904 is associated with a first operator and the LBT slot 906 is associated with a second operator. The LBT slot 904 may include a first operator downlink preamble 910 and a first operator uplink preamble 912. Similarly, the LBT slot 906 may include a second operator uplink preamble 916 and a second operator downlink preamble 914. Further, the transmission opportunity 902 may include a data transmission portion 908 for downlink and/or uplink transmission.

Figure 10:
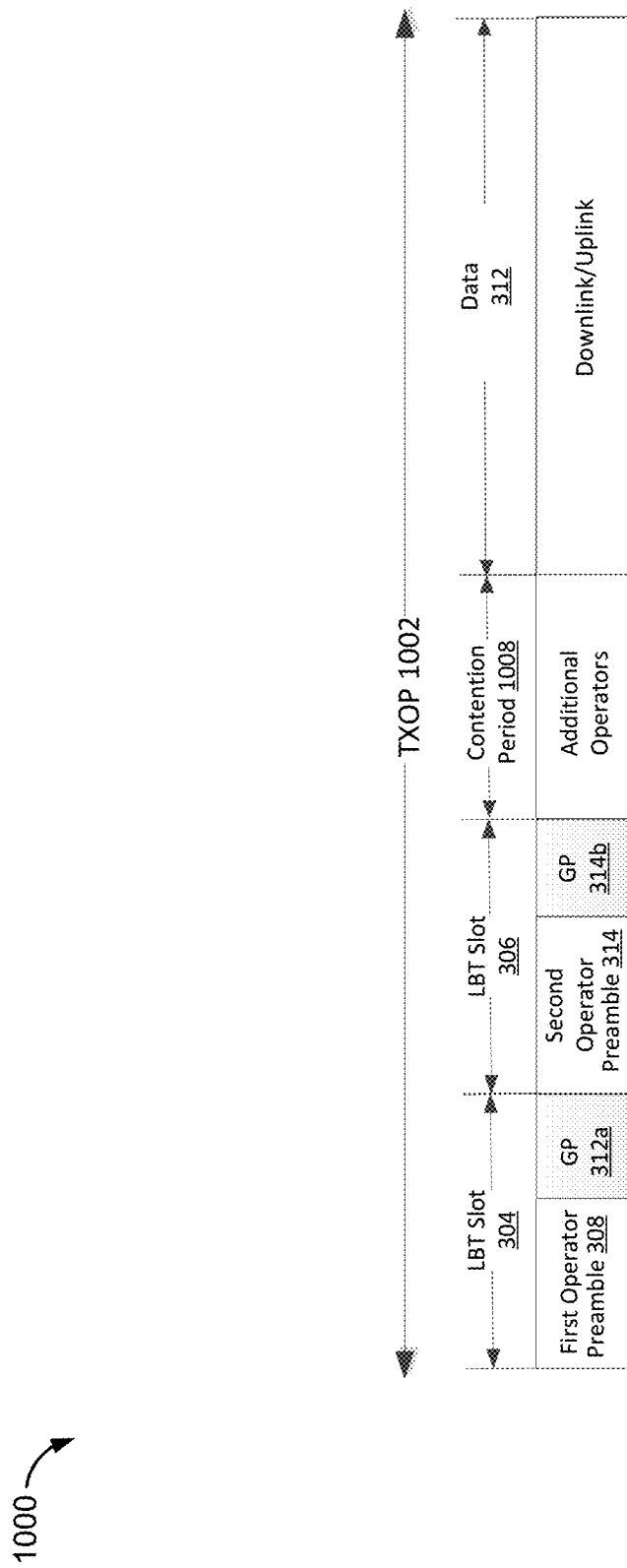
FIG. 10 is a conceptual diagram of a transmission opportunity communication structure in accordance with one or more example aspects.

FIG. 10 is a conceptual diagram of an example transmission opportunity communication structure 1000 in accordance with one or more example aspects. In some aspects, the priority-based medium sharing may be combined with a contention based LBT. For example, certain operators may be assigned priorities and those with the highest relative priorities may transmit their respective reservation preamble and utilize the transmission opportunity. Specifically, in the example shown with respect to transmission opportunity 1002, the first operator may have the highest priority but elected not to transmit. Similarly, the second operator has the second highest priority and also elected not to transmit following the first operator. The remaining operator may contend for the data transmission during the contention period 1008 on the transmission opportunity 1002. For example, a third operator and a fourth operator may contend for the transmission opportunity 1002 with the third operator prevailing over the fourth operator. The additional operators may contend for the medium with equal priority based on random backoff. In some aspects, the additional operators may only have the opportunity to contend for transmission on the transmission opportunity if the first and second operators do not elect to transmit on the transmission opportunity 1002.

Figure 11A:
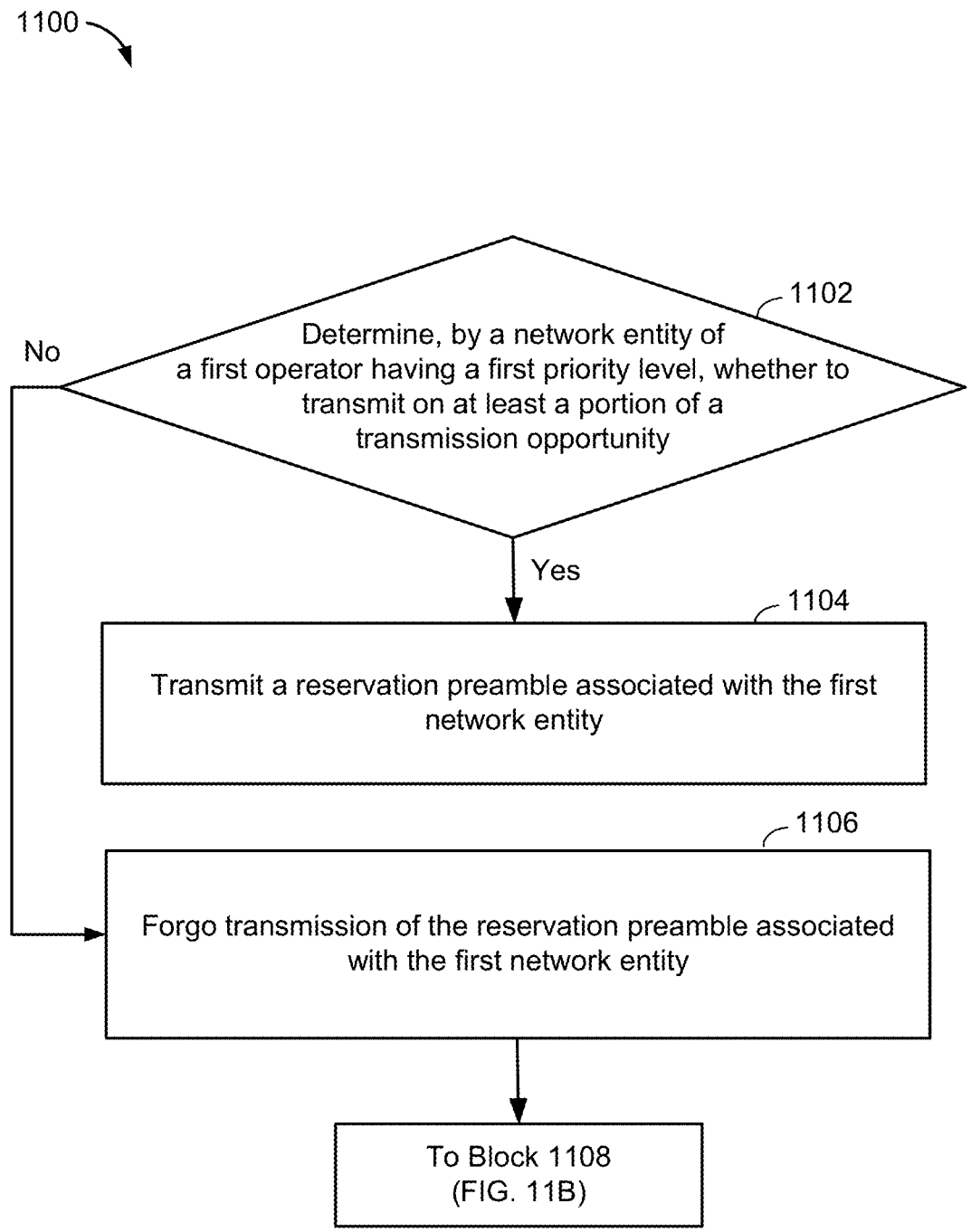
FIGS. 11A and 11B are flow diagrams illustrating an example method of communications in a wireless communication system in accordance with one or more example aspects.
Figure 11B:
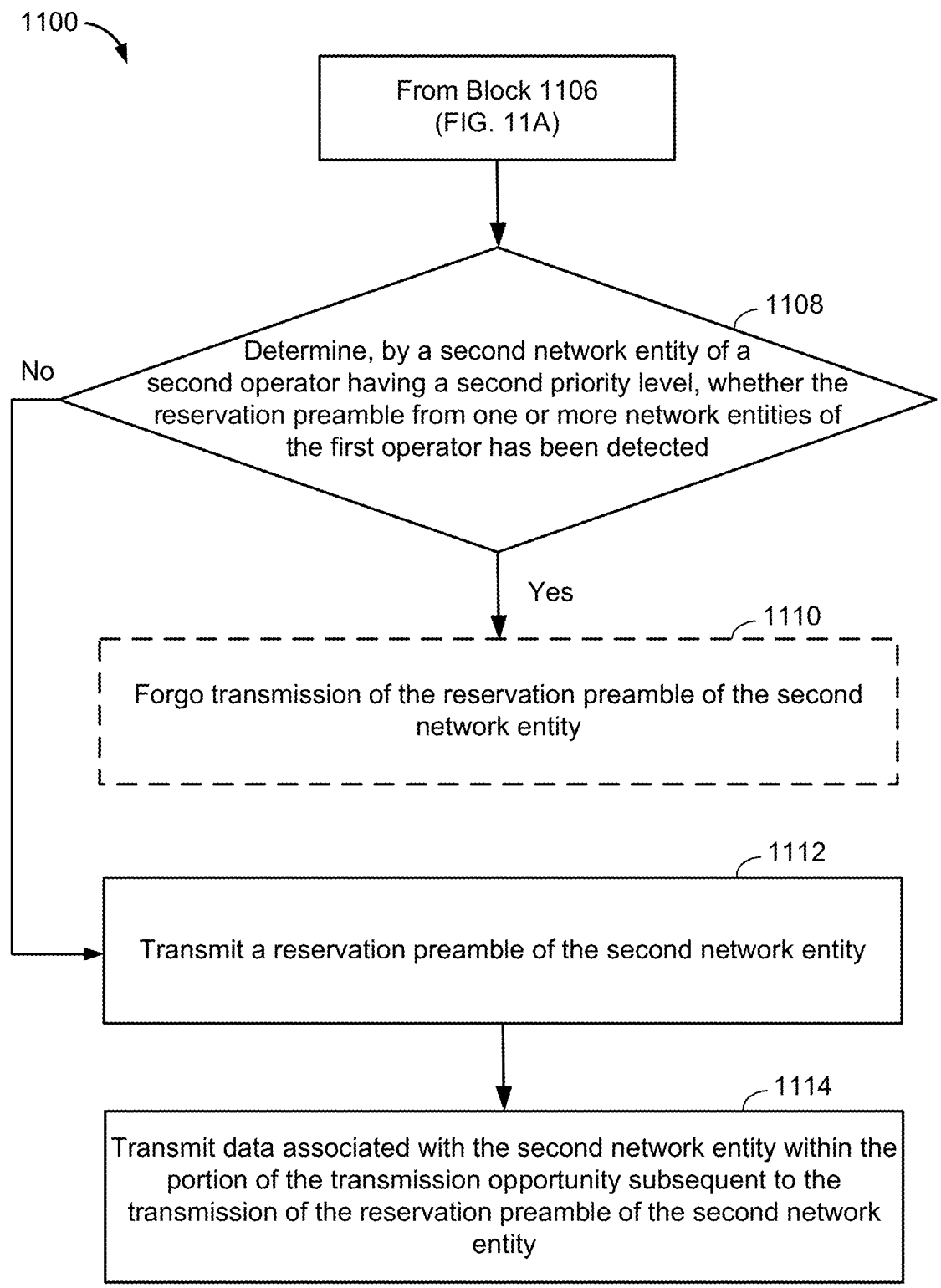

FIGS. 11A and 11B are flow diagrams illustrating examples of a method 1100 related to transmission of at least one reservation preamble in accordance with various aspects of the present disclosure. Although the operations described below are presented in a particular order and/or as being performed by an example component, the ordering of the actions and the components performing the actions may be varied, depending on the implementation. Also, although the reservation preamble transmission component 131 (FIG. 1B) is illustrated as having a number of subcomponents, it should be understood that one or more of the illustrated subcomponents may be separate from, but in communication with, the reservation preamble transmission component 131 (FIG. 1B), and/or each other. Moreover, any of actions or components described below with respect to the reservation preamble transmission component 131 (FIG. 1B) and/or its subcomponents may be performed by a specially-programmed processor, a processor executing specially-programmed software or computer-readable media, or by any other combination of a hardware component and/or a software component specially configured for performing the described actions or components. The dashed lines surrounding one or more blocks may represent optional steps.

In an aspect, at block 1102, the method 1100 may determine, by a network entity of a first operator having a first priority level, whether to transmit on at least a portion of a transmission opportunity. In an aspect, for example, the network entity 105 (FIG. 1B) and/or reservation preamble transmission component 131 (FIG. 1B) may execute the determination component 141 (FIG. 1B) to determine whether to transmit on at least a portion of a transmission opportunity, the first operator 112 having a first priority level.

At block 1104, the method 110 may transmit a reservation preamble associated with the first network entity. In an aspect, for example, the network entity 105 and/or reservation preamble transmission component 131 may execute transceiver 61 (FIG. 1B) to transmit a reservation preamble (e.g., first operator reservation preamble 133, FIG. 1B) associated with the first network entity 105 based on a determination by the first network entity 105 to transmit on at least the portion of the transmission opportunity.

At block 1106, the method 1100 may forgo transmission of the reservation preamble associated with the first network entity. In an aspect, for example, the network entity 105 and/or reservation preamble transmission component 131 may not execute transceiver 61 (FIG. 1B) to forgo transmission of the reservation preamble associated with the first network entity 105 based on a determination by the first network entity to not transmit on at least the portion of the transmission opportunity.

At block 1108, the method 110 may determine, by a second network entity of a second operator having a second priority level, whether the reservation preamble from one or more network entities of the first operator has been detected. In an aspect, for example, the network entity 106 (FIG. 1B) and/or reservation preamble transmission component 131 (FIG. 1B) may execute the determination component 141 (FIG. 1B) to determine whether the reservation preamble (e.g., first operator reservation preamble 133, FIG. 1B) from one or more network entities of the first operator 112 has been detected, the second operator 114 having a second priority level.

At block 1110, the method 1110 may forgo transmission of the reservation preamble of the second network entity. In an aspect, for example, the network entity 105 and/or reservation preamble transmission component 131 may not execute transceiver 61 (FIG. 1B) to forgo transmission of the reservation preamble of the second network entity 106 (e.g., second operator reservation preamble 140, FIG. 1B) based on a determination by a second network entity 106 of a second operator 114 having a second priority level that the reservation preamble from one or more network entities of the first operator 112 has been detected.

At block 1112, the method 1110 may transmit a reservation preamble of the second network entity. In an aspect, for example, the network entity 105 and/or reservation preamble transmission component 131 may execute transceiver 61 (FIG. 1B) to transmit a reservation preamble (e.g., second operator reservation preamble 140, FIG. 1B) of the second network entity 106 based on a determination that the reservation preamble from one or more network entities of the first operator 105 has not been detected by at least the second network entity 106.

At block 1114, the method 1110 may transmit data associated with the second network entity within the portion of the transmission opportunity subsequent to the transmission of the reservation preamble of the second network entity. In an aspect, for example, the network entity 105 and/or reservation preamble transmission component 131 may execute transceiver 61 (FIG. 1B) to transmit data associated with the second network entity 106 within the portion of the transmission opportunity subsequent to the transmission of the reservation preamble (e.g., second operator reservation preamble 140, FIG. 1B) of the second network entity 106.

In some aspects, the reservation preamble transmission 1104 may notify one or more other network entities belonging to lower priority operators that the network entity will transmit data on and/or access a channel during the portion of the transmission opportunity for a given operator. That is, the reservation preamble (e.g., second operator reservation preamble 133, FIG. 1B) of the first network entity 105 may notify one or more network entities including at least one of the second operator 114 network entity 106 that a network entities belonging to the first operator 112 may access a channel during the portion of the transmission opportunity.

The reservation preamble transmission 1104 may restrict access to the portion of the transmission opportunity for the one or more other network entities belonging to lower priority operators based on a determination at the one or more other network entities that the reservation preamble of the network entity has been transmitted. In some aspects, the method 1100 may, by a second network entity 106, restrict access to the portion of the transmission opportunity based on a determination that the reservation preamble from one or more network entities of the first operator 112 has been detected.

In some aspects, the reservation preamble of the first network entity 105 may be assigned a first listen-before-talk timeslot associated with the transmission opportunity and the reservation preamble of the second network entity 106 may be assigned a second listen-before-talk timeslot (e.g., after the first listen-before talk timeslot) associated with the transmission opportunity.

In some aspects, the reservation preamble 1104 may be transmitted within a portion corresponding to a listen-before-talk timeslot of the transmission opportunity for the operator that the network entity belongs to.

In some aspects, the first priority level of the first operator 112 may be greater than the second priority level of the second operator 114. In some aspects, the first priority level of the first operator 112 and the second priority level of the second operator 114 may indicate an order of access rights for transmission of data within the portion of the transmission opportunity.

In some aspects, transmitting the reservation preamble of the second network entity 106 may be transmitted during a second timeslot following a first timeslot assigned to the first operator 112. In some aspects, the first network entity 105 and second network entities 106 are synchronized.

The method 1100 may restrict, by a network entity 106 of the second operator 114, access to the portion of the transmission opportunity based on a determination that a downlink or an uplink reservation preamble of one or more network entities belonging to the first operator 112 has been detected.

In some aspects, the reservation preamble of the first network entity 105 (e.g., first operator reservation preamble 133) and the reservation preamble of the second network entity 106 (e.g., second operator reservation preamble 140) may include a unique sequence common to the first operator 112 and the second operator 114.

In some aspects, the reservation preamble of the first network entity 105 (e.g., first operator reservation preamble 133) may include a first operator-specific sequence and the reservation preamble of the second network entity 106 may include a second operator-specific sequence different from the first operator-specific sequence.

In some aspects, the reservation preamble of the first network entity 105 (e.g., first operator reservation preamble 133) include a cell-specific sequence and the reservation preamble of the second network entity 106 (e.g., second operator reservation preamble 140) may include a second cell-specific sequence different from the first cell-specific sequence.

In some aspects, the reservation preamble associated with the first network entity 105 may be detected at the second network entity 106 based on a determination that the reservation preamble is received at the second network entity 106 having a signal level above a reception threshold value. In some aspects, the reception threshold value may be configured by a network In some aspects, transmitting data by the second network entity 106 may include transmitting according to a maximum transmit power determined as a function of the received signal level of the reservation preamble associated with the first network entity 105.

In some aspects, transmitting the reservation preamble associated with the first network entity 105 or the reservation preamble associated with the second network entity 106 may include transmitting via a backhaul communication channel.

In some aspects, each of the first network entity 105 and the second network entity 106 may be part of a group of network entities associated with distinct operators. In some aspects, the first operator 112 associated with the first network entity 105 within the group of network entities may be assigned a highest priority level, the second operator 114 associated with the second network entity 106 within the group of network entities may be assigned a second highest priority level. In some aspects, a remaining number of operators are assigned the lowest priority level, where the network entities with the lowest priority level, upon determining that no reservation preamble from higher priority entities were detected, contend for the medium access without having ordered priorities within them.

Figure 12:
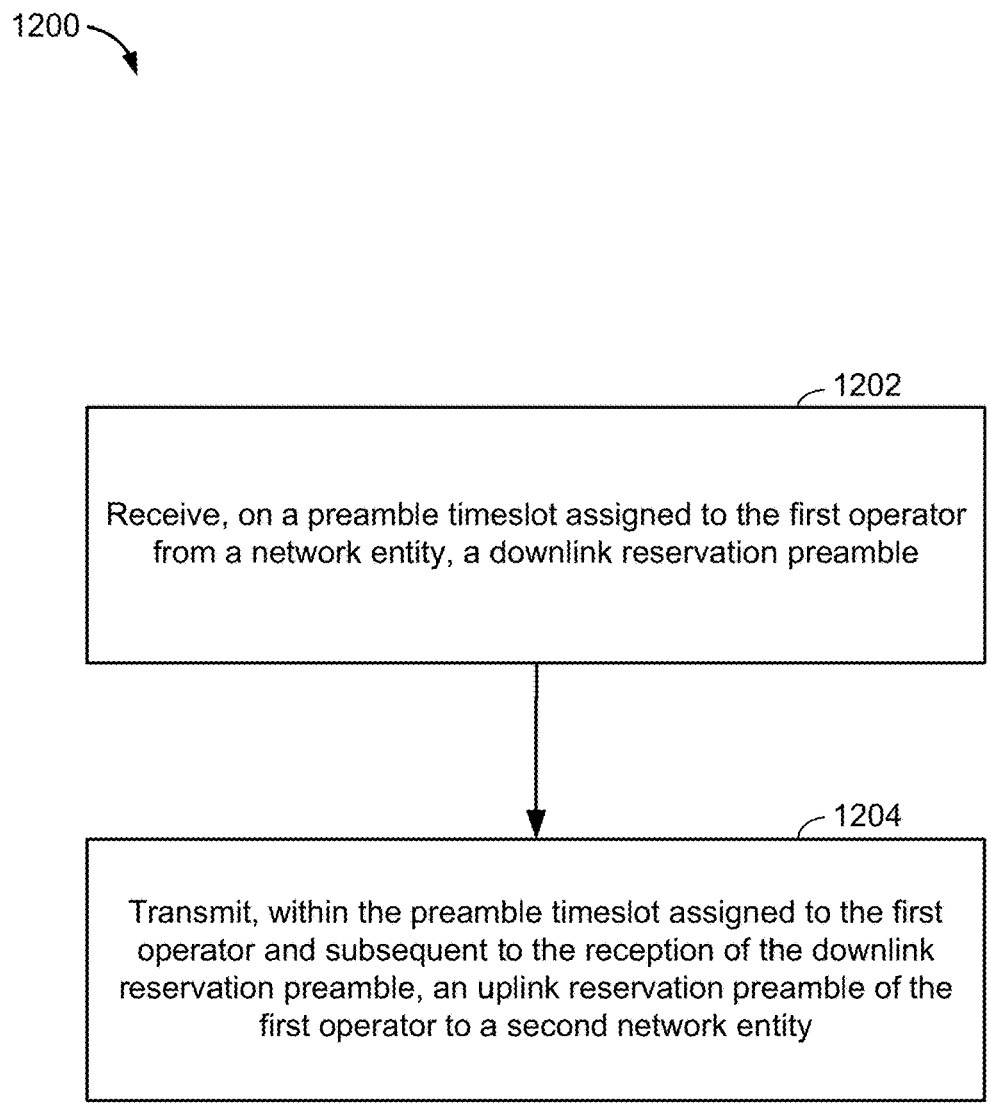
FIG. 12 is a flow diagram illustrating an example method of wireless communications at a network entity in accordance with one or more example aspects.

In some aspects, given 'N' operators, each of the 'M'<'N' operators may be given one of the highest 'M' priorities, and the rest 'N–M' operators may be given equal and lowest priority, and the 'N–M' operators may contend for the access of the transmission opportunity if the 'M' operators did not transmit preamble FIG. 12 is a flow diagram illustrating examples of a method 1200 related to wireless communication at a user equipment in accordance with aspects of the present disclosure. Although the operations described below are presented in a particular order and/or as being performed by an example component, the ordering of the actions and the components performing the actions may be varied, depending on the implementation. Also, although the preamble relay component 130 (FIG. 1A) is illustrated as having a number of subcomponents, one or more of the illustrated subcomponents may be separate from, but in communication with, the preamble relay component 130, and/or each other. Moreover, it should be understood that any of actions or components described below with respect to the preamble relay component 130 and/or its subcomponents may be performed by a specially-programmed processor, a processor executing specially-programmed software or computer-readable media, or by any other combination of a hardware component and/or a software component specially configured for performing the described actions or components. The dashed lines surrounding one or more blocks may represent optional steps.

At block 1202, the method 1200 may receive, on a preamble timeslot assigned to the first operator from a network entity, a downlink reservation preamble. In an aspect, for example, the UE 115 (FIG. 1A) and/or preamble relay component 130 (FIG. 1A) may receive, on a preamble timeslot assigned to the first operator 112 (FIG. 1A) from a network entity 105 (FIG. 1A), a downlink reservation preamble (e.g., first reservation preamble 132, FIG. 1A).

Further, at block 1204, the method 1200 may transmit, within the preamble timeslot assigned to the first operator and subsequent to the reception of the downlink reservation preamble, an uplink reservation preamble of the first operator to a second network entity. In an aspect, for example, the UE 115 (FIG. 1A) and/or preamble relay component 130 (FIG. 1A) may, within the preamble timeslot assigned to the first operator 112 (FIG. 1A) and subsequent to the reception of the downlink reservation preamble, an uplink reservation preamble of the first operator 112 (FIG. 1A) to a second network entity 106 (FIG. 1A).

In some aspects, the uplink reservation preamble may be received at other one or more network entities. In some aspects, the downlink reservation preamble includes at least one UE identifier. Further, in some aspects, although not shown, method 1200 may determine whether the first operator 112 corresponds to a second operator 114 associated with the UE 115. In some aspects, transmitting the uplink reservation preamble may include transmitting the uplink reservation preamble based on a determination that the at least one UE identifier corresponds to the identifier of the UE 115 (FIG. 1A).

In some aspects, receiving on the downlink reservation preamble may be performed on a downlink frequency band and transmitting on the uplink reservation preamble is performed on an uplink frequency band.

In some aspects, although not shown, method 1200 may receive an indication including a number of operators from the first network entity (e.g., network entity 105), and determine a transmission opportunity structure including at least one uplink listen-before-talk timeslot based on the number of operators from the first network entity.

In some aspects, transmitting the second reservation preamble 134 of the first operator 112 to the second network entity (e.g., network entity 106) includes transmitting the second reservation preamble 134 during the at least one uplink listen-before-talk timeslot.

In some aspects, transmitting the uplink reservation preamble may include transmitting the uplink reservation preamble when at least one network condition as configured via semi-static configuration for the UE 115 is met.

In some aspects, although not shown, the method 1200 may receive an indication including a number of operators from the first network entity 105, and determine a transmission opportunity structure including a starting location of a transmission opportunity including one or more listen-before-talk time slots based on the number of operators from the first network entity 105.

In some aspects, each listen-before-talk time slot may include a downlink portion and an uplink portion after the downlink portion, and wherein the downlink reservation preamble is transmitted in the downlink portion, and the uplink reservation is transmitted in the uplink portion.

In some aspects, the preamble timeslot may be associated with a transmission opportunity. Further, although not shown, the method 1200 may receive at least one of a duration or a priority of at least the transmission opportunity, monitor reservation preamble transmissions from higher priority operators than the first operator 112 for the transmission opportunity, determine that at least one of the higher priority operators transmitted an associated reservation preamble, and forgo monitoring of a channel for the duration of the transmission opportunity.

In some aspects, although not shown, the method 1200 may receive at least one of a duration or a priority of one or more transmission opportunities, and forgo monitoring of one or more listen-before-talk timeslots based on receiving at least one of a duration or a priority of one or more transmission opportunities.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor.

Accordingly, an aspect of the disclosure can include a computer readable medium embodying a method for dynamic bandwidth management for transmissions in unlicensed spectrum. Accordingly, the disclosure is not limited to the illustrated examples.

While the foregoing disclosure shows illustrative aspects, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of wireless communications at a user equipment (UE) associated with a first operator, comprising:
   receiving, on a preamble timeslot assigned to the first operator from a first network entity, a downlink reservation preamble;
   receiving an indication including a number of operators from the first network entity;
   determining a transmission opportunity structure of an uplink reservation preamble including a starting location of a transmission opportunity including one or more listen-before-talk time slots based on the number of operators from the first network entity; and
   transmitting, within the preamble timeslot assigned to the first operator and subsequent to the receiving of the downlink reservation preamble, the uplink reservation preamble of the first operator to a second network entity.

2. The method of claim 1, wherein the downlink reservation preamble includes at least one UE identifier, the method further comprising:
   determining whether the at least one UE identifier corresponds to an identifier of the UE,
   wherein transmitting the uplink reservation preamble includes transmitting the uplink reservation preamble based on a determination that the at least one UE identifier corresponds to the identifier of the UE.

3. The method of claim 2, wherein receiving on the downlink reservation preamble is performed on a downlink frequency band and transmitting on the uplink reservation preamble is performed on an uplink frequency band.

4. The method of claim 1, wherein transmitting the uplink reservation preamble includes transmitting the uplink reservation preamble when at least one network condition as configured via semi-static configuration for the UE is met.

5. The method of claim 1, wherein each listen-before-talk time slot includes a downlink portion and an uplink portion after the downlink portion, and wherein the downlink reservation preamble is transmitted in the downlink portion, and the uplink reservation preamble is transmitted in the uplink portion.

6. The method of claim 1, wherein the preamble timeslot is associated with a transmission opportunity, the method further comprising:
   receiving at least one of a duration or a priority of at least the transmission opportunity;
   monitoring reservation preamble transmissions from higher priority operators than the first operator for the transmission opportunity;
   determining that at least one of the higher priority operators transmitted an associated reservation preamble; and
   forgoing monitoring of a channel for the duration of the transmission opportunity.

7. An apparatus for wireless communications, comprising:
- a memory; and
- a processor coupled to the memory and configured to:
  - receive, on a preamble timeslot assigned to a first operator from a first network entity, a downlink reservation preamble;
  - receive an indication including a number of operators from the first network entity;
  - determine a transmission opportunity structure of an uplink reservation preamble including a starting location of a transmission opportunity including one or more listen-before-talk time slots based on the number of operators from the first network entity; and
  - transmit, within the preamble timeslot assigned to the first operator and subsequent to a reception of the downlink reservation preamble, the uplink reservation preamble of the first operator to a second network entity.

8. The apparatus of claim 7, wherein the downlink reservation preamble includes at least one user equipment (UE) identifier, wherein the processor is further configured to:
- determine whether the at least one UE identifier corresponds to an identifier of the apparatus,
- wherein to transmit the uplink reservation preamble, the processor is further configured to transmit the uplink reservation preamble based on a determination that the at least one UE identifier corresponds to the identifier of the apparatus.

9. The apparatus of claim 8, wherein receiving on the downlink reservation preamble is performed on a downlink frequency band and transmitting on the uplink reservation preamble is performed on an uplink frequency band.

10. The apparatus of claim 7, wherein to transmit the uplink reservation preamble, the processor is further configured to transmit the uplink reservation preamble when at least one network condition as configured via semi-static configuration for the apparatus is met.

11. The apparatus of claim 7, wherein each listen-before-talk time slot includes a downlink portion and an uplink portion after the downlink portion, and wherein the downlink reservation preamble is transmitted in the downlink portion, and the uplink reservation preamble is transmitted in the uplink portion.

12. The apparatus of claim 7, wherein the preamble timeslot is associated with a transmission opportunity, wherein the processor is further configured to:
- receive at least one of a duration or a priority of at least the transmission opportunity;
- monitor reservation preamble transmissions from higher priority operators than the first operator for the transmission opportunity;
- determine that at least one of the higher priority operators transmitted an associated reservation preamble; and
- forgo monitoring of a channel for the duration of the transmission opportunity.

13. A non-transitory computer-readable medium storing computer code executable by a processor for wireless communication by a user equipment (UE), comprising code for:
- receiving, on a preamble timeslot assigned to a first operator from a first network entity, a downlink reservation preamble;
- receiving an indication including a number of operators from the first network entity;
- determining a transmission opportunity structure of an uplink reservation preamble including a starting location of a transmission opportunity including one or more listen-before-talk time slots based on the number of operators from the first network entity; and
- transmitting, within the preamble timeslot assigned to the first operator and subsequent to the receiving of the downlink reservation preamble, the uplink reservation preamble of the first operator to a second network entity.

14. The non-transitory computer-readable medium of claim 13, wherein the downlink reservation preamble includes at least one UE identifier, and further comprising code for:
- determining whether the at least one UE identifier corresponds to an identifier of the UE,
- wherein transmitting the uplink reservation preamble includes transmitting the uplink reservation preamble based on a determination that the at least one UE identifier corresponds to the identifier of the UE.

15. The non-transitory computer-readable medium of claim 14, wherein receiving on the downlink reservation preamble is performed on a downlink frequency band and transmitting on the uplink reservation preamble is performed on an uplink frequency band.

16. The non-transitory computer-readable medium of claim 13, wherein transmitting the uplink reservation preamble includes transmitting the uplink reservation preamble when at least one network condition as configured via semi-static configuration for the UE is met.

17. The non-transitory computer-readable medium of claim 13,
- wherein each listen-before-talk time slot includes a downlink portion and an uplink portion after the downlink portion, and wherein the downlink reservation preamble is transmitted in the downlink portion, and the uplink reservation preamble is transmitted in the uplink portion.

18. The non-transitory computer-readable medium of claim 13, wherein the preamble timeslot is associated with the transmission opportunity, and further comprising code for:
- receiving at least one of a duration or a priority of at least the transmission opportunity;
- monitoring reservation preamble transmissions from higher priority operators than the first operator for the transmission opportunity;
- determining that at least one of the higher priority operators transmitted an associated reservation preamble; and
- forgoing monitoring of a channel for the duration of the transmission opportunity.

* * * * *